US008484424B2

(12) United States Patent
Ito et al.

(10) Patent No.: US 8,484,424 B2
(45) Date of Patent: Jul. 9, 2013

(54) STORAGE SYSTEM, CONTROL PROGRAM AND STORAGE SYSTEM CONTROL METHOD

(75) Inventors: Shintaro Ito, Yokohama (JP); Norio Shimozono, Machida (JP)

(73) Assignee: Hitachi, Ltd., Tokyo (JP)

( * ) Notice: Subject to any disclaimer, the term of this patent is extended or adjusted under 35 U.S.C. 154(b) by 547 days.

(21) Appl. No.: 12/338,238

(22) Filed: Dec. 18, 2008

(65) Prior Publication Data

US 2010/0083120 A1 Apr. 1, 2010

(30) Foreign Application Priority Data

Sep. 30, 2008 (JP) ................................. 2008-253466

(51) Int. Cl.
*G06F 12/00* (2006.01)
(52) U.S. Cl.
USPC .......................................... 711/147; 711/156
(58) Field of Classification Search
USPC ................................ 711/147, 156
See application file for complete search history.

(56) References Cited

U.S. PATENT DOCUMENTS

| 5,720,028 | A | 2/1998 | Matsumoto et al. |
| 7,167,949 | B2* | 1/2007 | Yamagami et al. ........... 711/111 |
| 7,493,443 | B2* | 2/2009 | Inoue et al. .................... 711/112 |
| 2003/0101317 | A1 | 5/2003 | Mizuno et al. |
| 2006/0031650 | A1* | 2/2006 | Kanai et al. ................... 711/162 |
| 2006/0248245 | A1 | 11/2006 | Ninomiya et al. |
| 2007/0061518 | A1 | 3/2007 | Gotoh |
| 2007/0226441 | A1* | 9/2007 | Uchiumi et al. .............. 711/164 |
| 2008/0065829 | A1 | 3/2008 | Inoue et al. |
| 2008/0263190 | A1 | 10/2008 | Serizawa et al. |

FOREIGN PATENT DOCUMENTS

| JP | 07-105095 | 4/1995 |
| JP | 3264465 | 12/2001 |
| JP | 2003-162377 | 6/2003 |
| JP | 2005-122763 | 5/2005 |
| JP | 2005-267545 | 9/2005 |
| JP | 2007-79958 | 3/2007 |
| JP | 2008-65706 | 3/2008 |
| JP | 2008-269424 A | 11/2008 |

OTHER PUBLICATIONS

"An Overview of Reflective Memory Systems", Jovanovic, Jun. 1999 pp. 56-64.*
Office Action in Japanese Patent Application Ser. No. 2008-253466, dated May 22, 2012, (in Japanese, 4 pages), [English language translation, 4 pgs.].
Office Action in Japanese Patent Application Ser. No. 2012-162740, mailed Dec. 25, 2012, (in Japanese, 5 pages), [English language translation, 7 pgs.].

* cited by examiner

*Primary Examiner* — Matthew Bradley
(74) *Attorney, Agent, or Firm* — Antonelli, Terry, Stout & Kraus, LLP.

(57) ABSTRACT

There is provided a storage system including one or more LDEVs, one or more processors, a local memory or memories corresponding to the processor or processors, and a shared memory, which is shared by the processors, wherein control information on I/O processing or application processing is stored in the shared memory, and the processor caches a part of the control information in different storage areas on a type-by-type basis in the local memory or memories corresponding to the processor or processors in referring to the control information stored in the shared memory.

18 Claims, 30 Drawing Sheets

FIG. 7

| LM ADDRESS | SM ADDRESS | LAST ACCESS TIME |
|---|---|---|
| 0x00000000 | 0x00000000 | 2008-09-01-00.00.00.000000 |
| 0x00001000 | - | - |
| 0x00002000 | 0x00050000 | 2008-09-04-02.33.28.123443 |
| 0x00003000 | 0x00000300 | 2008-09-02-18.26.13.214834 |
| 0x00007000 | 0x00024000 | 2008-09-01-12.05.44.314188 |
| 0x00011000 | 0x00004000 | 2008-09-05-07.12.55.122555 |

FIG. 8

| CONTROL INFORMATION NAME | SM ADDRESS RANGE | STORAGE AREA INDEX NUMBER RANGE |
|---|---|---|
| LDEV INFORMATION TABLE | 0x00000000 – 0x00007FFF | 1 – 500 |
| REAL LDEV MANAGEMENT TABLE | 0x00008000 – 0x0000FFFF | 501 – 800 |
| VIRTUAL-REAL ADDRESS CONVERSION TABLE | 0x00010000 – 0x0002FFFF | 801 – 1500 |
| RESPONSIBLE MPPK TABLE | 0x00030000 – 0x000304FF | - |
| PATH MANAGEMENT TABLE | 0x00030500 – 0x000306FF | - |
| ... | ... | ... |

| LDEV NUMBER (4101) | APPLIED APPLICATION (4102) | CAPACITY (4103) |
|---|---|---|
| 0 | - | 100GB |
| 1 | - | 200GB |
| 2 | VIRTUAL LDEV | 100GB |
| ... | ... | ... |

| REAL LDEV NUMBER (4411) | REAL LDEV CAPACITY (4412) | USED CAPACITY (4413) |
|---|---|---|
| 7 | 100GB | 50GB |
| 8 | 100GB | 30GB |
| 9 | 50GB | 20GB |
| ... | ... | ... |

| PORT NUMBER | PATH NAME | LDEV NUMBER |
|---|---|---|
| 0 | XXX | 0 |
| 0 | YYY | 1 |
| 1 | XXX | 1 |
| ... | ... | ... |

FIG. 22

| CONTROL INFORMATION NAME | CONFIGURATION DEPENDENT INFORMATION SIZE | CAPACITY DEPENDENT INFORMATION SIZE | USED APPLICATION | APPLICATION APPLIED STATUS |
|---|---|---|---|---|
| LDEV INFORMATION TABLE | 100B/LDEV | - | ALL | APPLIED |
| REAL LDEV MANAGEMENT TABLE | 200B/LDEV | - | VIRTUAL LDEV | APPLIED |
| VIRTUAL-REAL ADDRESS CONVERSION TABLE | - | 8B/256KB | VIRTUAL LDEV | APPLIED |
| RESPONSIBLE MPPK TABLE | - | - | - | - |
| PATH MANAGEMENT TABLE | - | - | - | - |
| ... | ... | ... | ... | ... |

FIG. 23

| CONTROL INFORMATION NAME | STORAGE AREA SIZE |
|---|---|
| LDEV INFORMATION TABLE | 50MB |
| REAL LDEV MANAGEMENT TABLE | 100MB |
| VIRTUAL-REAL ADDRESS CONVERSION TABLE | 200MB |
| ... | ... |

FIG. 32

| CONTROL INFORMATION NAME | SM ADDRESS RANGE | STORAGE AREA INDEX RANGE | EXCLUSIVELY USE FLAG |
|---|---|---|---|
| LDEV INFORMATION TABLE | 0x00000000 – 0x00007FFF | 1 – 500 | 0 |
| REAL LDEV MANAGEMENT TABLE | 0x00008000 – 0x0000FFFF | 501 – 800 | 0 |
| VIRTUAL-REAL ADDRESS CONVERSION TABLE | 0x00010000 – 0x0002FFFF | 801 – 1500 | 1 |
| RESPONSIBLE MPPK TABLE | 0x00030000 – 0x000304FF | - | 0 |
| PATH MANAGEMENT TABLE | 0x00030500 – 0x000306FF | - | 0 |
| ... | ... | ... | ... |

5220, 5221, 5222, 5223, 5224

STORAGE SYSTEM, CONTROL PROGRAM AND STORAGE SYSTEM CONTROL METHOD

CROSS REFERENCES TO RELATED APPLICATIONS

This application relates to and claims priority from Japanese Patent Application No. 2008-253466, filed on Sep. 30, 2008, the entire disclosure of which is incorporated herein by reference.

BACKGROUND OF THE INVENTION

1. Field of the Invention

The present invention relates to enhancement of performance of a storage system, and it particularly relates to an effective technology applicable to a storage system that has multiple processors and controls disk apparatus by using control information in a shared memory, a control program therefor and a storage system control method.

2. Description of the Related Art

As a high-performance and highly reliable storage system, Japanese Patent Publication No. 3264465 (Patent Document 1) discloses a storage system that operates by distributing routines over multiple processors and storing control information on a disk apparatus, a volume and a storage application, which are required to refer and/or update in accordance with I/O processing and/or other processing in a shared memory (SM) among the processors.

SUMMARY OF THE INVENTION

In a storage system having multiple processor as disclosed in Patent Document 1, an access to the SM has a longer access latency than an access to a local memory (LM) directly connecting to the corresponding processor because the SM is accessed over a network among the processors. This may reduce the performance of the system when the number of accesses to the SM increases.

In order to avoid the problem, the whole control information in the SM may be stored in the LMs of the processors. However, it requires holding copies of the whole control information, the number of which is equal to the number of processors, and a large number of required LMs may increase the costs.

Accordingly, it is an object of the present invention to provide a storage system having multiple processors with much higher performance by enhancing the access performance to control information in a shared memory, without requiring a large number of local memories.

The object, other objects and inventive characteristics of the present invention will be apparent from the description in the specification and attached drawings.

The outline of representative embodiments of the invention in the subject application will be briefly described below.

A storage system according to a typical embodiment of the present invention is applicable to a storage system, a control program therefor and a storage system control method, for example, and has characteristic as follows. That is, the storage system includes one or more volumes, one or more processors, one or more local memories corresponding to the processor or processors, and a shared memory, which is shared by the processors, wherein control information on I/O processing or processing relating to a storage application is stored in the shared memory, and the processor caches a part of the control information in different storage areas on a type-by-type basis in the local memory or memories corresponding to the processor or processors in referring to the control information stored in the shared memory.

The advantages which can be obtained by representative embodiments of the invention disclosed in the subject application will be briefly described below.

In a representative embodiment of the invention, the processing performance of a storage system can be enhanced by the access to a part of control information cached by a control program that operates in a processor in referring to the control information in an SM. The LM hit probability on control information which is accessed frequently can be improved, which thus improves the processing performance of a storage system, by cashing the control information on a type-by-type basis in different storage areas in an LM.

BRIEF DESCRIPTION OF THE DRAWINGS

FIG. 7 is a diagram showing a configuration example of the LM-SM correspondence table according to the first embodiment of the invention;

FIG. 8 is a diagram showing a configuration example of the control information cache management table according to the first embodiment of the invention;

FIG. 9 is a diagram showing a configuration example of the LDEV information table according to the first embodiment of the invention;

FIG. 10 is a diagram showing a configuration example of the real LDEV management table according to the first embodiment of the invention;

FIG. 22 is a diagram showing a configuration example of the control information size table according to the second embodiment of the invention;

FIG. 23 is a diagram showing a configuration example of the storage area size table according to the second embodiment of the invention;

FIG. 32 is a diagram showing a configuration example of the control information cache management table according to a fourth embodiment of the invention;

DESCRIPTION OF THE PREFERRED EMBODIMENTS

Figure 1:
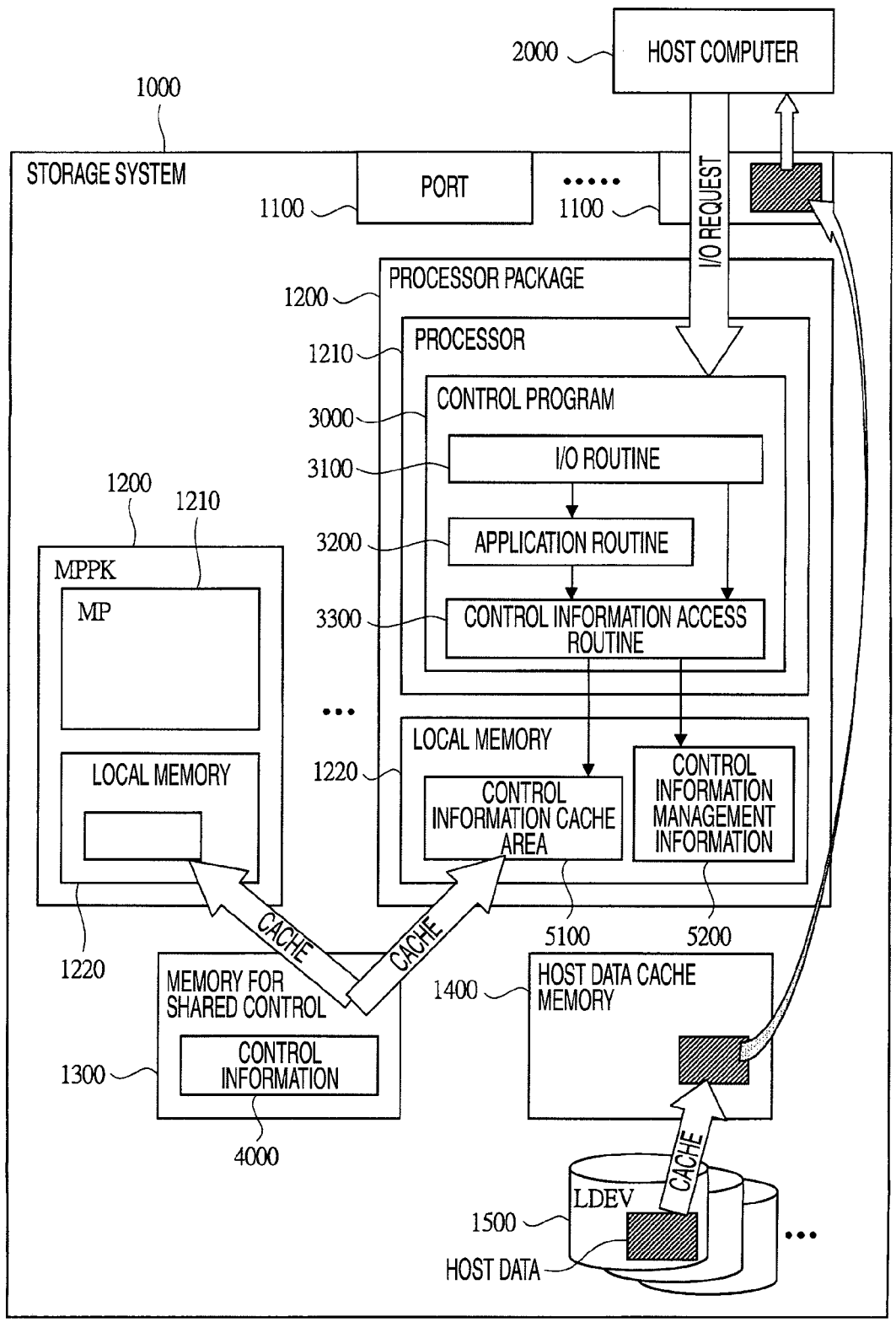
FIG. 1 is a diagram showing an outline of a configuration example of the computer system which is a first embodiment of the invention.

With reference to drawings, embodiments of the present invention will be described in detail below. Like reference numerals refer to like parts throughout all drawings for describing embodiments, and repetitive description thereon will be omitted herein.

[Outline]

A storage system according to an embodiment of the invention includes multiple processors, an SM shared by the processors and LMs, which directly connect to the processors and are accessible fast. A control program operates in each of the processors and processes an I/O request transmitted from a host computer by accessing control information in the SM.

In the storage system of this embodiment, the control program operating in each of the processors accesses a part of the control information cached in the corresponding LM in referring to the control information in the SM. Thus, the target control information can be referred fast if the control information to be accessed is already cached in the corresponding LM (which may be called "LM hit". Therefore, the performance of the system can be enhanced. If the control information in the SM is updated, the update is notified to the other processors in order to keep consistency with the control information cached in the other LMs. The other processors having received the notification of the update invalidate the control information in the LMs corresponding to the updated part.

Here, if a part of control information, instead of the entire control information, in the SM is cached in an LM, there is a possibility that the probability of the LM hit of the control information cached in the LM may decrease, which may deteriorate the performance of the system, in some access patterns from a host computer. Accordingly, the storage system of this embodiment controls caching to an LM by dividing the control information in the SM into two of configuration dependent information and capacity dependent information.

The configuration dependent information is control information the amount of which depends on the configuration of a storage system and which is accessed frequently. For example, the configuration dependent information may correspond to information held for each storage system (such as management information on the hardware configuration of a storage system), information held for each volume (such as attribute information on a volume and definition information on an access path to a volume), setting information for a function of a storage (such as correspondence information between a source and a destination for a copy function (which is a function of copying volume data)). The configuration dependent information is accessed frequently every I/O to be referred independently of areas within the volume to be accessed by a host computer and has a high degree of importance.

The capacity dependent information on the other hand may be individual control information corresponding to an area within a volume (such as management information on a copied area by a copy function), and the subject to be accessed depends on the pattern of I/O from a host computer. Each control information is referred or updated only if an area within a corresponding volume is accessed from a host computer.

The configuration dependent information is smaller in size as control information than the capacity dependent information that increases in proportion to the capacity of a volume because configuration dependent information is control information present for each apparatus or volume. Therefore, there is a characteristic that configuration dependent information which is small in amount is accessed intensively in control information.

In a case where configuration dependent information and capacity dependent information share a control information cache area in an LM, the range of accesses to the capacity dependent information increases as the range of accesses from a host computer increases. Thus, the proportion of the capacity dependent information increases within the control information cache area. For that reason, the capacity dependent information with a low degree of frequency of reference may expel the configuration dependent information with a high degree of frequency of reference from the control information cache area, which frequently causes a state that the target control information is not cached in an LM (which may be called "LM miss" hereinafter) and causes slow accesses to the SM. Therefore, the processing performance of the system may decrease.

In order to avoid this, the control information cache area to store control information is divided into small areas (which may be called "storage areas") for pieces of control information. Each piece of control information is stored in a fixed storage area and is not stored in other storage areas. This can prevent the situation where the configuration dependent information which is required to store by priority in the control information cache area in an LM is expelled by the capacity dependent information which is not required to store there from the control information cache area and can keep the LM hit probability. In this case, each of the storage areas for configuration dependent information desirably has a size enough for storing all pieces of configuration dependent information.

The setting for a storage area may be changed when the size of the corresponding configuration dependent information changes as in the change in configuration of a storage system so that the enough size of storage area for configuration dependent information can be allocated and maintained, which can maintain the performance of the system. Because it can be assumed that the configuration of a storage system is not changed frequently, the setting changing processing on a storage area as described above is not a large load.

Because control information which is not referred frequently does not have a large effect for enhancement of the performance of a system if it is cached in an LM, the efficiency of LM use can be increased by excluding it from cache subjects. Furthermore, information which is updated frequently may also be excluded from cache subjects in order to prevent the reduction of the performance of a system because it frequently causes processing of notifying an update to other processors if any and it may cause the possibility of reduction of the performance of the system.

In response to a request from the management terminal, the status of use (such as the proportion of the capacity allocated to a required size of a storage area and the LM hit probability of a cached control information) of each storage area of the control information cache area is displayed as management information. In accordance with an instruction from a manager on the basis of the displayed management information, the settings of the storage areas may be changed or the volume to be controlled is moved to another processor so that the control information piece to be handled by the processor can be changed. Thus, the usage of the control information cache area in an LM can be optimized and the performance of the system can be maintained in accordance with the status of use of the storage system.

No notification of the update to other processors when control information to be referred alone by a specific processor at a certain time is updated can save the processing of the notification of update and the processing upon reception of an update notification, which can enhance the performance of a system.

The computer system according to an embodiment of the invention having the storage system as described above will be more specifically described as first to fourth embodiments below.

First Embodiment

The computer system which is a first embodiment of the invention will be described below.

[System Configuration]

FIG. 1 is a diagram showing an outline of a configuration example of the computer system which is this embodiment. The compute system of this embodiment includes a storage system 1000 and a host computer (or host) 2000.

The storage system 1000 includes one or more ports 1100 for communicating with the host 2000, one or more processor packages (MPPK: Micro Processor package) 1200, a memory for shared control (or shared memory: SM) 1300, a host data cache memory (or cache memory: CM) 1400, and one or more volumes (or Logical Device: LDEV) 1500. The LDEV 1500 has an LDEV number for uniquely identifying the LDEV 1500 by the storage system 1000.

The host 2000 transmits an I/O (or Input/Output) request to the storage system 1000 for writing or reading data to or from the storage system 1000. The I/O request may be an SCSI (Small Computer System Interface) command, for example, and include information indicating the description between read and write, an SCSI port number indicating the apparatus to be accessed, an LUN (Logical Unit Number) and an LBA (Logical Block Address) indicating the area to be accessed, for example.

Because the storage system 1000 operates to access the LDEV 1500, the port 1100 converts the port number and LUN to an LDEV number by using path management information, which will be described later, converts the LBA to an LDEV address and transmits an I/O request to the MPPK 1200.

Each of the MPPK 1200 is a package having one or more processors (or Micro Processor: MP) 1210 and a local memory (or LM) 1220. The MPPK 1200 that is responsible for the corresponding I/O processing (which may be called "responsible MPPK" hereinafter) is set for each of the LDEVs 1500.

The CM 1400 is a cache memory which is generally used for increasing the access speed to host data stored in the LDEV 1500 and temporarily stores a part of host data stored in the LDEV 1500, which allows fast access to data which is accessed by the host 2000 frequently. The CM 1400 is not used for caching control information 4000, which is a characteristic of the storage system 1000 of this embodiment.

The SM 1300 in the storage system 1000 stores the control information 4000 for management the components such as the LDEVs 1500, CM 1400 and ports 1100.

A control program 3000 operates in each of the MP 1210 within the MPPK 1200. The control program 3000 includes components of an I/O routine 3100 that processes an I/O request from the host 2000, which is allocated from the port 1100, an application routine 3200 and a control information access routine 3300 to be invoked by them for accessing the control information 4000 in the SM 1300.

The application routine 3200 is a routine corresponding to a storage application which is a function provided by the storage system 1000 (which may be simply called "application" hereinafter) for the purpose of increasing the degree of reliability or compressing the amount of data. The copy function (which is a function of copying volume data) and a virtual LDEV function, which will be described later, may be examples of the application. The application is described for explaining a specific example, for example, of the control information 4000 in the storage system 1000 of this embodiment and is not an essential component of the concept of the invention.

In processing an I/O request to the LDEV 1500 to which one of the applications is applied, the MP 1210 invokes the target application processing 3200 through the I/O routine 3100 and performs unique processing of the application. The control information access routine 3300 is invoked for referring and/or updating the control information 4000 stored in the SM 1300 among the I/O routine 3100, application routines 3200 and so on.

In this case, control information access routine 3300 stores a part of control information 4000 in the SM 1300 into a control information cache area 5100 in the LM 1220 and accesses it. This can replace the slow access to the SM 1300 by the fast access to the LM 1220, reduces the overhead of the access to the control information 4000 and can enhance the system performance. In the cache processing on the control information 4000, the control information access routine 3300 accesses control information management information 5200 stored in the LM 1220. The details of the routines will be described later.

[Application (Virtual LDEV)]

Figure 2:
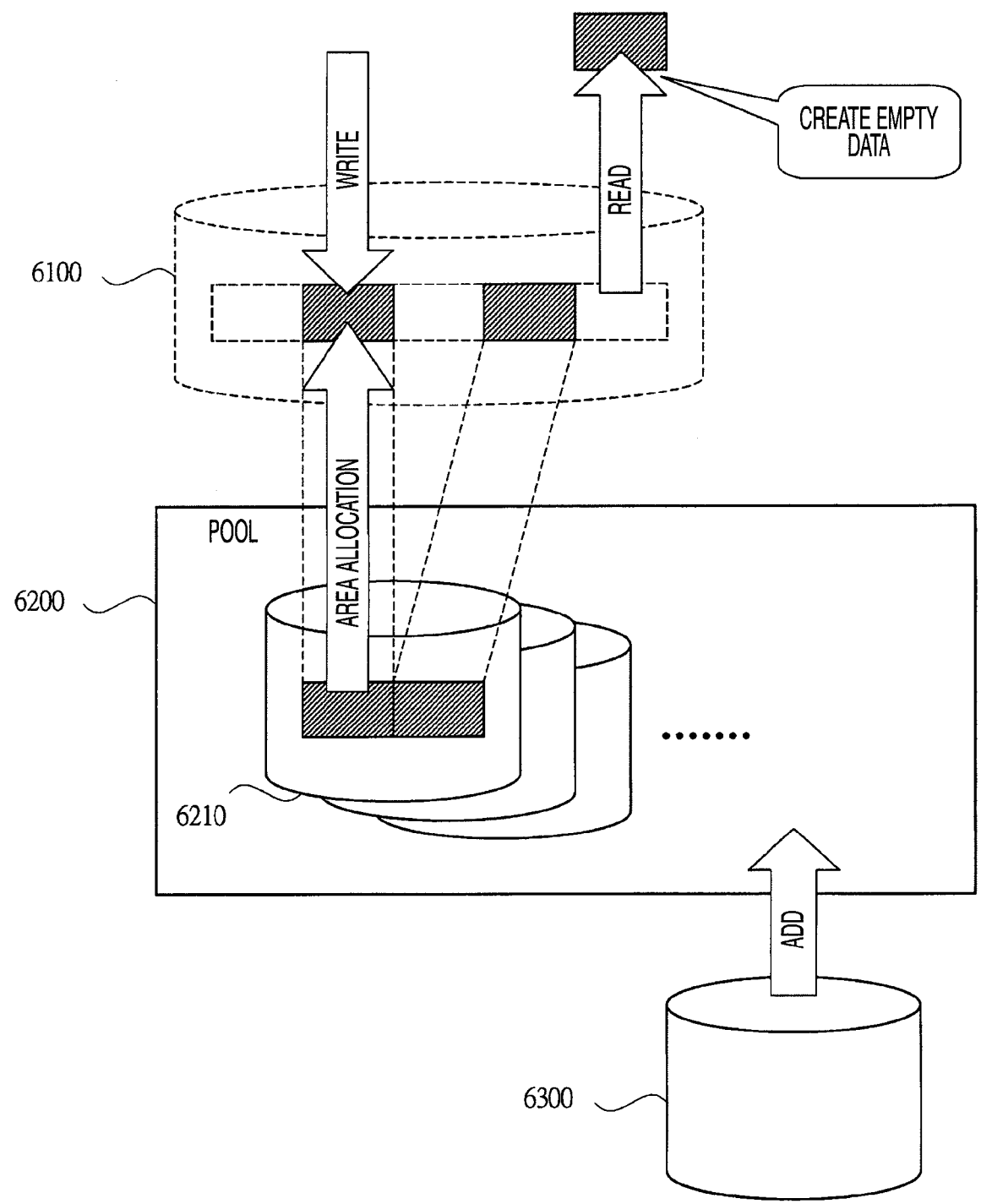
FIG. 2 is a diagram illustrating an outline of a virtual LDEV function in the first embodiment of the invention.

The storage system 1000 of this embodiment may include a virtual LDEV function as an example of the applications. The virtual LDEV function in the storage system 1000 of this embodiment will be described below. FIG. 2 is a diagram illustrating an outline of the virtual LDEV function.

The virtual LDEV function creates a virtual LDEV to which a real area is not allocated and delays the allocation of a real area until data is written therein. The LDEV for allocating a real area to a virtual LDEV is called real LDEV, and an address of an area in the real LDEV, which is assigned to an address (which is a virtual address) in the virtual LDEV is called real address.

In FIG. 2, the real LDEV 6210 is managed in a pool 6200. If a new real LDEV 6300 is added to the pool 6200, the added real LDEV 6300 is determined as a target to allocate a real area relative to the virtual LDEV 6100, and the actually used area is managed.

If an I/O request targets the virtual LDEV 6100 and a real area has been allocated to the virtual address included in the I/O request first, the corresponding real address is obtained, and the obtained real address is actually accessed.

If data is written to an area to which a real area in the virtual LDEV 6100 has not been allocated yet, one of those having unused areas in the real LDEV 6210 added to the pool 6200 is selected by a round-robin system, and the unused area is allocated where data is then written. If data is read from an area where a real area has not been allocated, empty data is created and is returned, which can prevent the consumption of real areas.

By using the function in this way, the number of real LDEV 6210 can be flexibly increased in accordance with the used capacity of the virtual LDEV 6100. Sharing the real LDEV 6210 with other virtual LDEV 6100 can increase the efficiency of use of the disk apparatus.

[Hardware Configuration]

Figure 3:
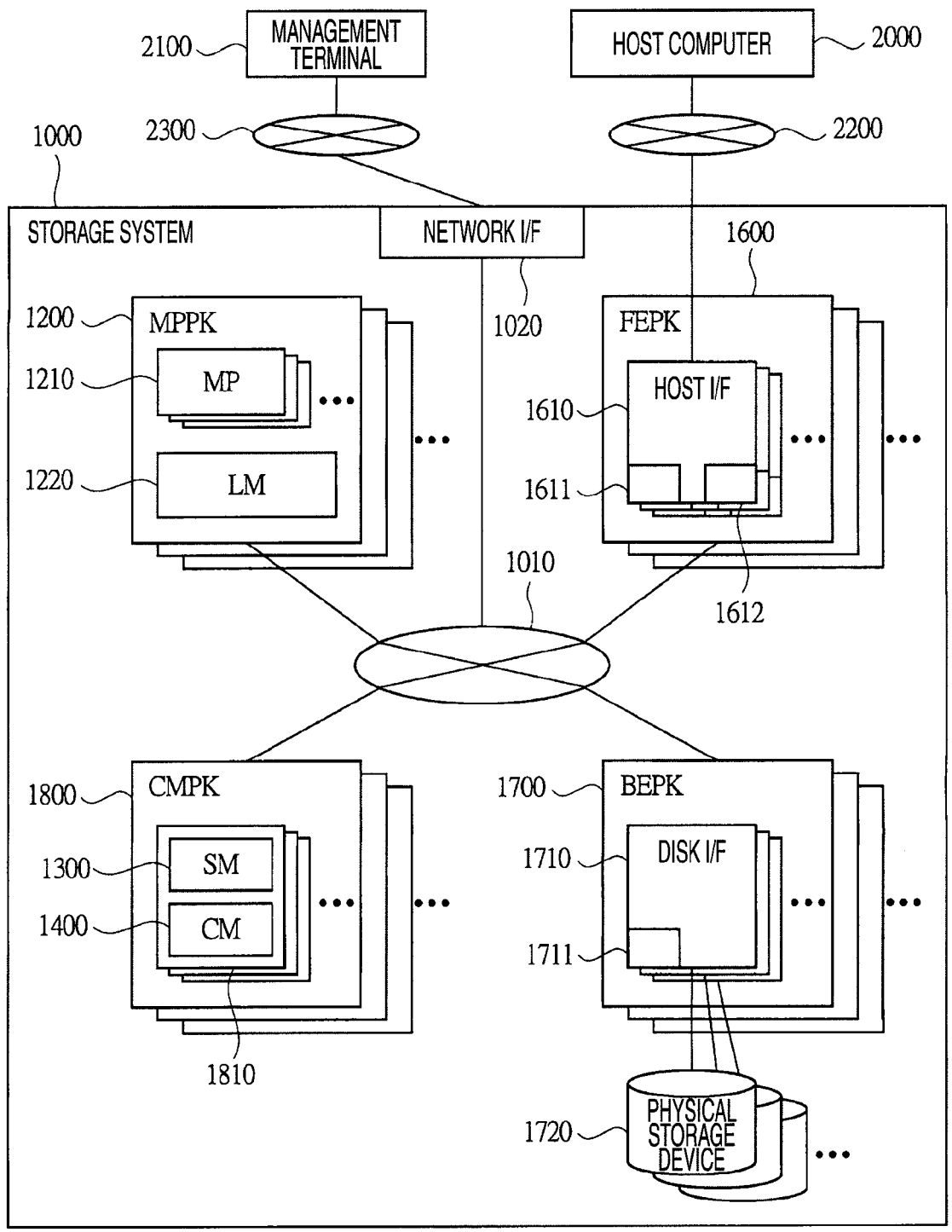
FIG. 3 is a diagram showing a hardware configuration example of the computer system according to the first embodiment of the invention.

FIG. 3 is a diagram showing a hardware configuration example of the computer system of this embodiment. The computer system of this embodiment includes a host computer (host) 2000, a data transfer network 2200, a management terminal 2100, a management network 2300 and the storage system 1000.

The storage system 1000 includes the MPPK 1200, one or more cache memory package (CMPK) 1800, one or more backend package (BEPK) 1700, one or more physical storage device 1720, one or more front end package (FEPK) 1600, a network I/F 1020 connecting to the management network 2300, and an internal connecting network 1010 connecting them mutually.

The CMPK 1800 may include one or more non-volatile semiconductor memory 1810 and is used as the SM 1300 and CM 1400 in FIG. 1.

The BEPK 1700 includes one or more disk I/F 1710, and the disk I/F 1710 connects to and communicates with the multiple physical storage devices 1720. The disk I/F 1710 may be an FC (Fibre Channel) port. The disk I/F 1710 includes a data transfer processor 1711, and the data transfer processor 1711 performs data transfer from the physical storage device 1720 to the CM 1400.

The FEPK 1600 includes one or more host I/Fs 1610 connecting to the data transfer network 2200. The host I/F 1610 may be an FC port. The host I/F 1610 includes a data transfer processor 1611, and the data transfer processor 1611 performs data transfer from the CM 1400 to the host 2000. The host I/F 1610 includes a host I/F buffer memory 1612 for holding information on a correspondence relationship between the responsible MPPK and LDEV 1500 and/or information on a correspondence relationship among the LDEV 1500, a port number and an LUN.

The storage system 1000 connects to the host 2000 over the data transfer network 2200 and connects to a management terminal 2100 for management the storage system 1000 over the management network 2300. The data transfer network 2200 may be an FC-SAN (storage area network), and management network 2300 may be a LAN (local area network) based on the IP. The network I/F 1020 may be an Ethernet (registered trademark) port. The storage system 1000 may directly connect to the host 2000 and management terminal 2100 over no networks.

The internal connecting network 1010 of the storage system 1000 may be a cross bar switch or bus, for example, through which the MP 1201 can communicate with the SM 1300, host I/F 1610, disk I/F 1710, network I/F 1020 and LMs 1220 of other MPPKs 1200.

The physical storage device 1720 may be an HDD (Hard Disk Drive) or an SSD (Solid State Drive). The storage system 1000 manages the physical storage device 1720 as the LDEV 1500. The one-to-one correspondence is not required between the LDEV 1500 and the physical storage device 1720. One physical storage device 1720 may include multiple LDEVs 1500, or one LDEV 1500 may include multiple physical storage devices 1720.

[Configuration of Control Program]

Figure 4:
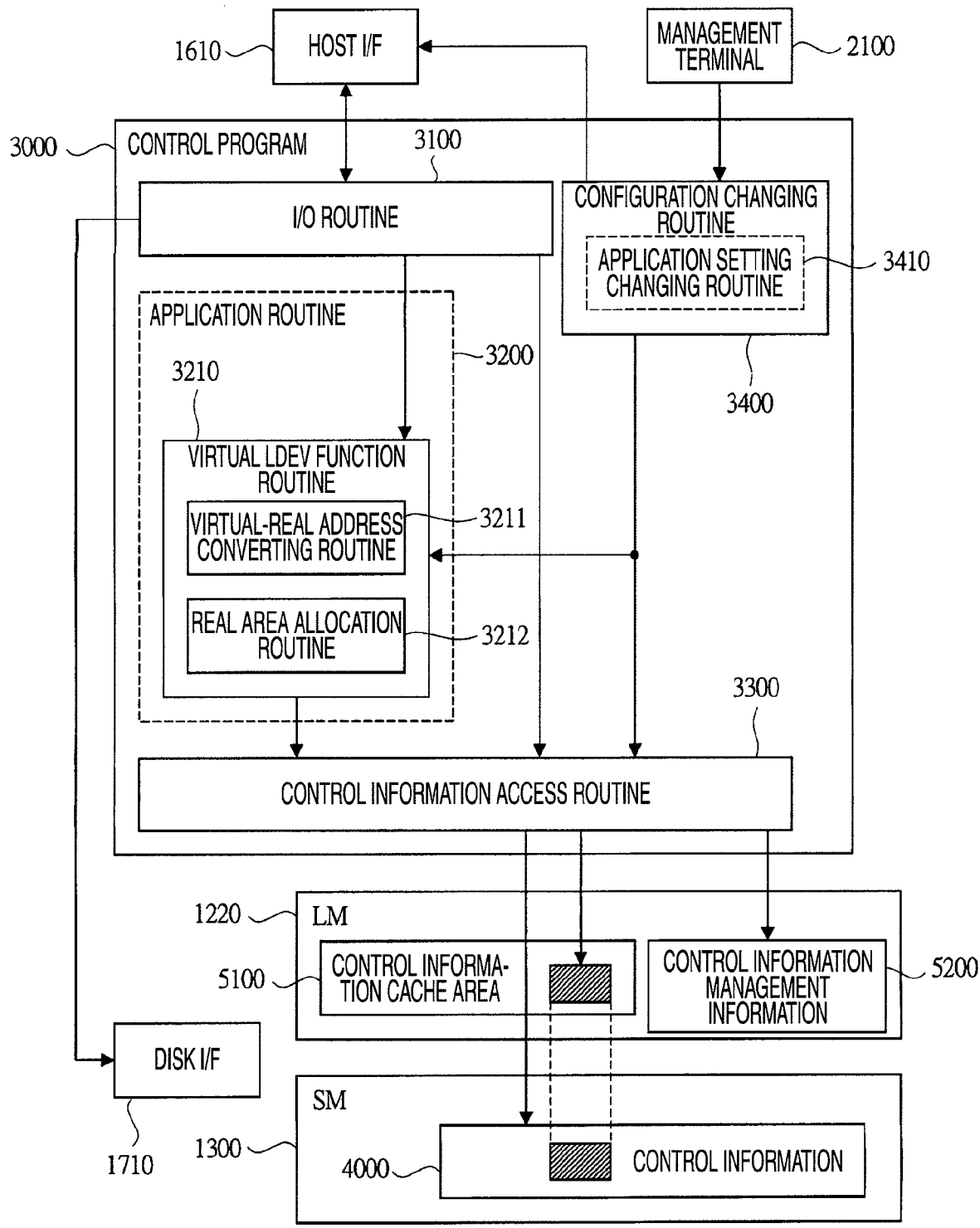
FIG. 4 is a diagram showing a configuration example of the control program 3000 in the computer system according to the first embodiment of the invention.

FIG. 4 is a diagram showing a configuration example of the control program 3000 in the computer system of this embodiment. The control program 3000 includes an I/O routine 3100, an application routine 3200, a control information access routine 3300 and a configuration changing routine 3400 that processes a configuration changing request by the management terminal 2100.

As described above, the application routine 3200 in the storage system 1000 of this embodiment is a virtual LDEV function routine 3210. The virtual LDEV function routine 3210 may include a virtual-real address converting routine 3211 that converts a virtual address to the corresponding real address and a real area allocation routine 3212 that allocates a real area from the unused areas of the real LDEV 6210 added to the pool 6200.

The I/O routine 3100 performs data transfer routine on the basis of the LDEV number and LDEV address requested by the host 2000. In this case, if the LDEV address requested by the host 2000 is a virtual address, the I/O routine performs processing after converting the LDEV number and LDEV address to a real LDEV number and a real address through the virtual-real address converting routine 3211.

In response to a read access, whether the target host data exists in the CM 1400 or not is determined. If so, the host I/F 1610 is instructed the data transfer from the CM 1400 to the host 2000. If not, the LDEV address is converted to the address of the physical storage device 1720, and the disk I/F 1710 is instructed the data transfer from the physical storage device 1720 to the CM 1400. Then, if the host data is stored in the CM 1400, the host I/F 1610 is instructed the data transfer from the CM 1400 to the host 2000.

In response to a write access, the host I/F 1610 is instructed the data transfer from the host 2000 to the CM 1400. Then, the data transfer from the CM 1400 to the physical storage device 1720 is instructed, which is followed by the wait for the completion. Alternatively, the data transfer from the CM 1400 to the physical storage device 1720 is instructed asynchronously. Because the methods for the correspondence between LDEVs 1500 and the physical storage devices 1720 and/or the caching of host data are well known technologies as disclosed in JP-A-2005-301802, the detail descriptions thereon will be omitted herein.

The configuration changing routine 3400 is a routine of changing the settings of the components within the storage system 1000, and an application setting changing routine 3410 therein changes the settings for applications. The configuration changing routine 3400 may create or delete an LDEV 1500, create or delete the copy pair of an LDEV 1500 and create or delete a virtual LDEV 6100.

The control information 4000 in the SM 1300 is accessed as required during the routines in the control program 3000. The routines invoke the control information access routine 3300 on a case-by-case basis, but the control information access routine caches a part of the control information 4000 in the SM 1300 into a control information cache area 5100 in the LM 1220 and accesses it there in order to prevent frequent access to the slow SM 1300.

The method for caching the control information 4000 may apply a generally known cache technology used for host data, as described above. The storage system 1000 of this embodiment divides the address space of the SM 1300 into units in a size of the order of several tens bytes (which may be called "lines" hereinafter). The control information 4000 is loaded from the SM 1300 on a line-by-line basis and is stored in the control information cache area 5100 in the LM 1220.

If the control information 4000 to be accessed exists in the control information cache area 5100 in the LM 1220 (LM hit), the information is loaded from the fast LM 1220, which can reduce the waiting time by the MP 1210. If the control information 4000 to be accessed does not exist in the control information cache area 5100 (LM miss), the access to the slow SM 1300 is required, which increasing the waiting time by the MP 1210 and thus reduces the processing performance of the MP 1210.

Because the control information 4000 in the SM 1300 is shared with other MPPKs 1200, if the control information 4000 is updated by another MPPK 1200 and the same information is cached in the LM 1220, inconsistency occurs therebetween. Accordingly, if the control information 4000 is updated, the control information 4000 in the SM 1300 must be updated, and the update must be notified to the other MPPKs 1200, regardless of whether the information is cached in the LM 1220 or not.

[Configuration of Control Information]

Figure 5:
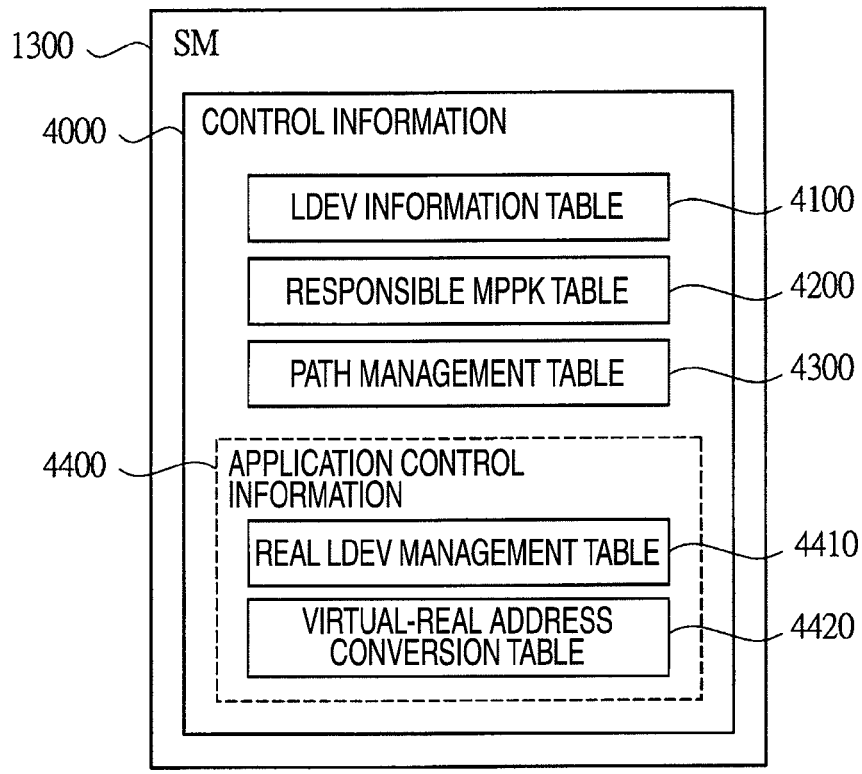
FIG. 5 is a diagram showing a configuration example of control information 4000 in an SM according to the first embodiment of the invention.

FIG. 5 is a diagram showing a configuration example of the control information 4000 in the SM 1300. The SM 1300 stores, as the control information 4000, an LDEV information table 4100 storing basic information of each LDEV 1500, a responsible MPPK table 4200 managing correspondence relationships between the LDEVs 1500 and the corresponding responsible MPPKs, a path management table 4300 managing correspondence relationships between SCSI port numbers and LUNs and the LDEVs 1500, and application control information 4400 which are unique to each application.

The application control information 4400 of this embodiment may include, as control information on the virtual LDEV function, a real LDEV management table 4410 managing a real LDEV 6210 and a virtual-real address conversion table 4420 having correspondence between a virtual address and a real address, for example.

Here, dividing the control information 4000 in the SM 1300 according to this embodiment into the configuration dependent information and the capacity dependent information, the LDEV information table 4100, real LDEV management table 4410, responsible MPPK table 4200 and path management table 4300 are configuration dependent information, and the virtual-real address conversion table 4420 is capacity dependent information.

Other control information 4000 may be statistics information counting the number of I/O requests from the host computer 2000, for example. The statistics information is updated every I/O but is only referred in response to a request for displaying the status of operation of a storage by the management terminal 2100. Thus, not caching the control information 4000 which is updated frequently but is rarely referred can prevent the reduction of the performance of the system.

On the other hand, the virtual-real address conversion table 4420 is updated only when an area to which a real area has not been allocated is accessed and is not updated after a real area is allocated thereto. Caching the control information 4000 which is rarely updated but is referred frequently every I/O can enhance the performance of the system.

Figure 6:
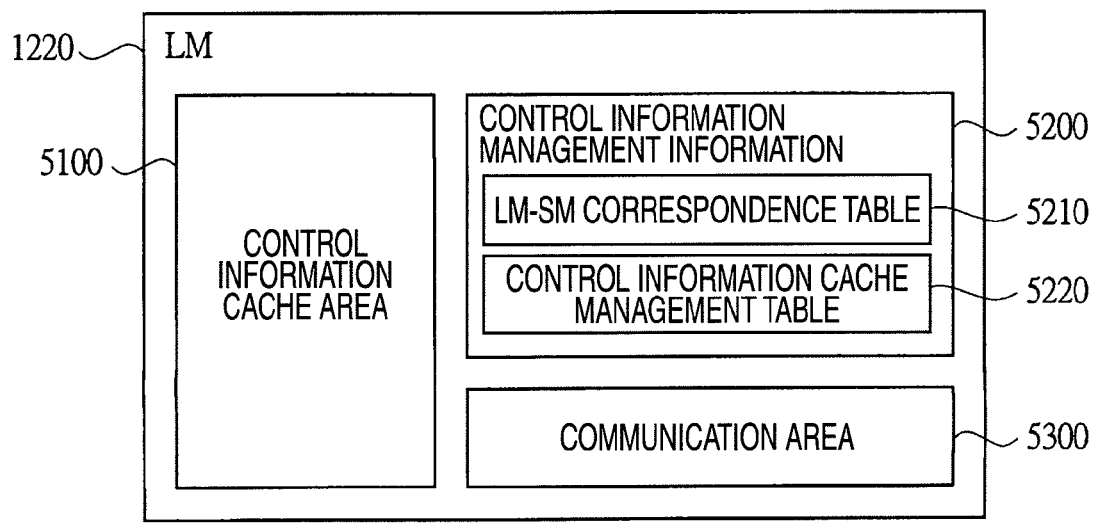
FIG. 6 is a diagram showing a configuration example of the information in an LM according to the first embodiment of the invention.

FIG. 6 is a diagram showing a configuration example of the information in the LM 1220. The LM 1220 stores a control information cache area 5100 for caching the control information 4000 in the SM 1300, a control information management information 5200, and a communication area 5300 for storing a notification from another MP 1210, for example.

The control information management information 5200 has an area in the control information cache area 5100 in the LM 1220, an LM-SM correspondence table 5210 having correspondence between an area (that is, control information 4000 cached in the area) and an area in the SM 1300, and control information cache management table 5220 that manages a storage area in the control information cache area 5100 corresponding to the type of control information 4000.

FIG. 7 is a diagram showing a configuration example of the LM-SM correspondence table 5210 in the control information management information 5200. The LM-SM correspondence table 5210 is a table that manages correspondence between lines in the control information cache area 5100 in the LM 1220 and areas in the SM 1300 and includes multiple LM-SM correspondence tables 5210 having a fixed number of (four in the example in FIG. 7) entries. Numbers (which may be called "index number") are given to the LM-SM correspondence tables 5210.

In this way, the correspondence between an address in the SM 1300 (which may be called SM address) and an address in the LM 1220 (which may be called LM address) can be searched fast by managing the correspondences between LM addresses and SM addresses on multiple correspondence tables having a small number of entries instead of the management on a single correspondence table and calculating the index number fast by a hash function, for example, from SM addresses or LM addresses.

Each of the LM-SM correspondence tables 5210 has entries including an LM address field 5211, an SM address field 5212 and a last access time field 5213. The LM address field 5211 stores an LM address. The LM address of each entry on the LM-SM correspondence table 5210 corresponds to an address in the control information cache area 5100 on a one-to-one basis.

The SM address field 5212 stores an SM address in an area in the SM 1300 storing the control information 4000 corresponding to the control information 4000 stored in the area in the control information cache area 5100 indicated by the LM address in the LM address field 5211 of the same entry. The last access time field 5213 stores the time when the control information 4000 cached in the control information cache area 5100 indicated by the LM address in the LM address field 5211 of the same entry is finally referred. The last access time field 5213 is used for identifying the entry which has not been accessed for the longest period of time on each of the LM-SM correspondence table 5210.

FIG. 8 is a diagram showing a configuration example of the control information cache management table 5220, which is the control information management information 5200. The control information cache management table 5220 manages areas in the control information cache area 5100 at the SMs 1300 and LMs 1220 storing all types of the control information 4000 on an index-number basis of the LM-SM correspondence tables 5210.

The control information cache management table 5220 has entries including a control information name field 5221, an SM address range field 5222 and a storage area index number range field 5223. The control information field 5221 stores a control information name for identifying a piece of the control information 4000. In this embodiment, the control information names are notated by characters for convenience of description. In the implementation, an ID assigned for identifying each piece of the control information 4000 may be set instead.

The SM address range field 5222 stores the beginning address and the end address of an area in the SM 1300 storing the piece of the control information 4000 indicated by the control information name in the control information name field 5221 of the same entry. The storage area index number range field 5223 stores the beginning index number and the end index number of the area in the LM 1220 caching the piece of the control information 4000 indicated by the control information name in the control information name field 5221 of the same entry. If the field stores no values, the target piece of the control information 4000 is not to be cached.

In this way, the control information cache management table 5220 allows managing each of the types of control information 4000 regarding whether it is a subject to cache or not and the storage area to cache.

The type of each piece of the control information 4000 is checked from the SM address to be accessed by using the control information cache management table 5220 in the caching method for the control information 4000 in the storage system 1000 of this embodiment. However, a method can be adopted including designating the type of the control information 4000, instead of the SM address to be accessed, when the I/O routine 3100 invokes control information access routine 3300.

FIG. 9 is a diagram showing a configuration example of the LDEV information table 4100, which is the control information 4000. The LDEV information table 4100 has entries including an LDEV number field 4101, an applied application field 4102 and a capacity field 4103 for each of all of the LDEVs 1500, independently of whether the LDEV 1500 is a virtual LDEV or not.

The LDEV number field 4101 stores an LDEV number. The used application field 4102 stores the type of the application to be applied to the LDEV 1500 indicating the LDEV number in the LDEV number field 4101 of the same entry. For convenience of description, the name of the application to be applied is notated by characters in this embodiment. However, in the implementation, an ID, which is applied for identifying each application may be set, for example. Multiple applications may be applied to each of the LDEVs 1500. The capacity field 4103 stores a value indicating the capacity of the LDEV 1500 indicated by the LDEV number in the LDEV number field 4101 of the same entry.

FIG. 10 is a diagram showing a configuration example of the real LDEV management table 4410, which is the control information 4000. The real LDEV management table 4410 has entries including a real LDEV number field 4411, real LDEV capacity field 4412 and a used capacity field 4413 for each of all of the real LDEVs 6210 registered with the pool 6200.

The real LDEV number field 4411 stores an LDEV number of a real LDEV 6210. The real LDEV capacity field 4412 stores a value indicating the capacity of the real LDEV 6210 indicated by the LDEV number in the real LDEV number field 4411 of the same entry. The used capacity field 4413 stores the value indicating the capacity in use of the real LDEV 6210 indicated by the LDEV number in the real LDEV number field 4411 of the same entry. It is assumed that the storage system 1000 of this embodiment stores data of a real LDEV 6210 from the beginning. Thus, by referring to the used capacity field 4413, the unused area to store data next can be located.

Figure 11:
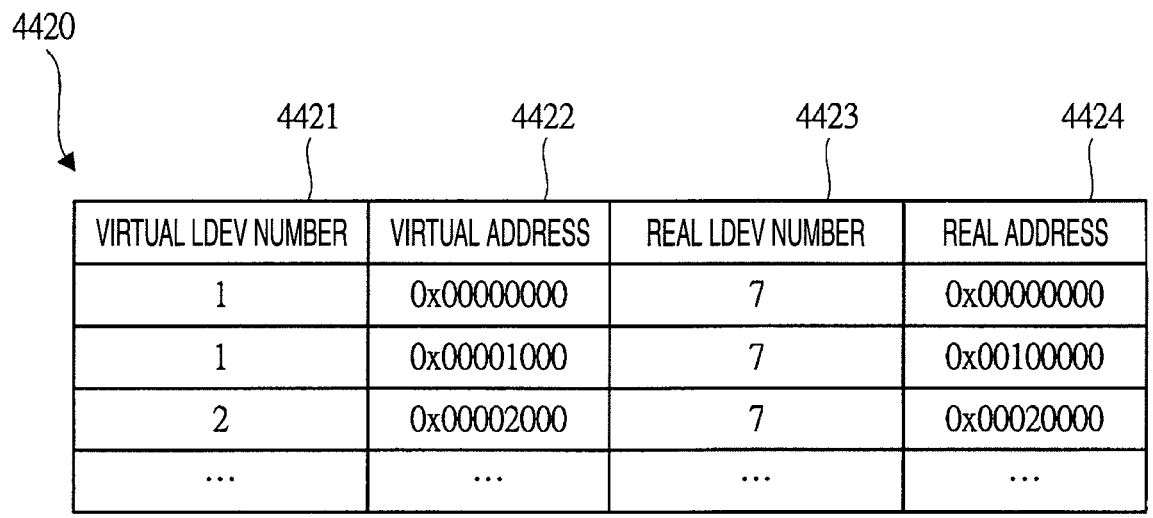
FIG. 11 is a diagram showing a configuration example of the virtual-real address conversion table according to the first embodiment of the invention.

FIG. 11 is a diagram showing a configuration example of the virtual-real address conversion table 4420, which is the control information 4000. The virtual-real address conversion table 4420 has entries including a virtual LDEV number field 4421, a virtual address field 4422, a real LDEV number field 4423 and a real address field 4424 for an address space in which real areas have been allocated to all virtual LDEVs.

The virtual LDEV number field 4421 and virtual address field 4422 store an LDEV number and a virtual address, respectively, of the virtual LDEV to which a real area is allocated. The real LDEV number field 4423 and virtual address field 4424 store an LDEV number of a real LDEV 6210 to which a real area is allocated and the address (which is a real address) of the area in the real LDEV 6210 in connection with the virtual address in the virtual LDEV indicated by the virtual LDEV number field and virtual address field of the same entry.

Figure 12:
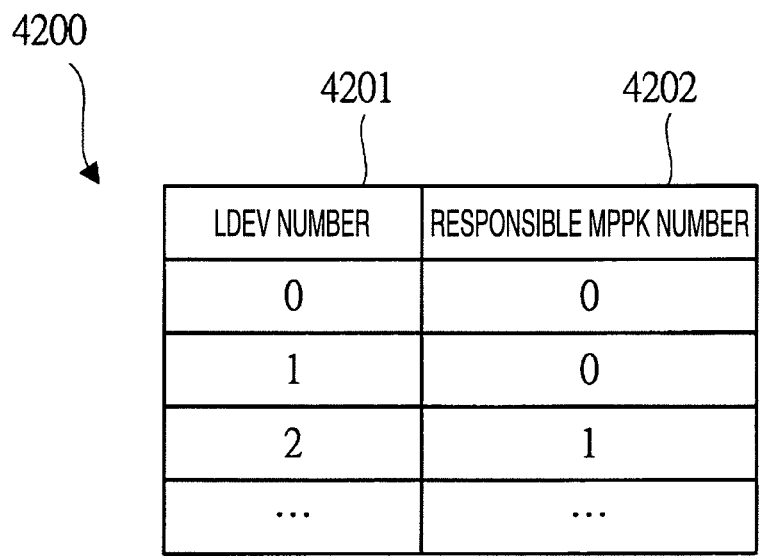
FIG. 12 is a diagram showing a configuration example of the responsible MPPK table according to the first embodiment of the invention.

FIG. 12 is a diagram showing a configuration example of the responsible MPPK table 4200, which is the control information 4000. The responsible MPPK table 4200 has entries including an LDEV number field 4201 and a responsible MPPK number field 4202 for each of all LDEVs 1500.

The LDEV number field 4201 stores an LDEV number. The responsible MPPK number field 4202 stores an MPPK number (which is a number for identifying an MPPK 1200) indicating the responsible MPPK in the LDEV 1500 indicated by the LDEV number in the LDEV number field 4201 of the same entry.

Figures 13, 14:
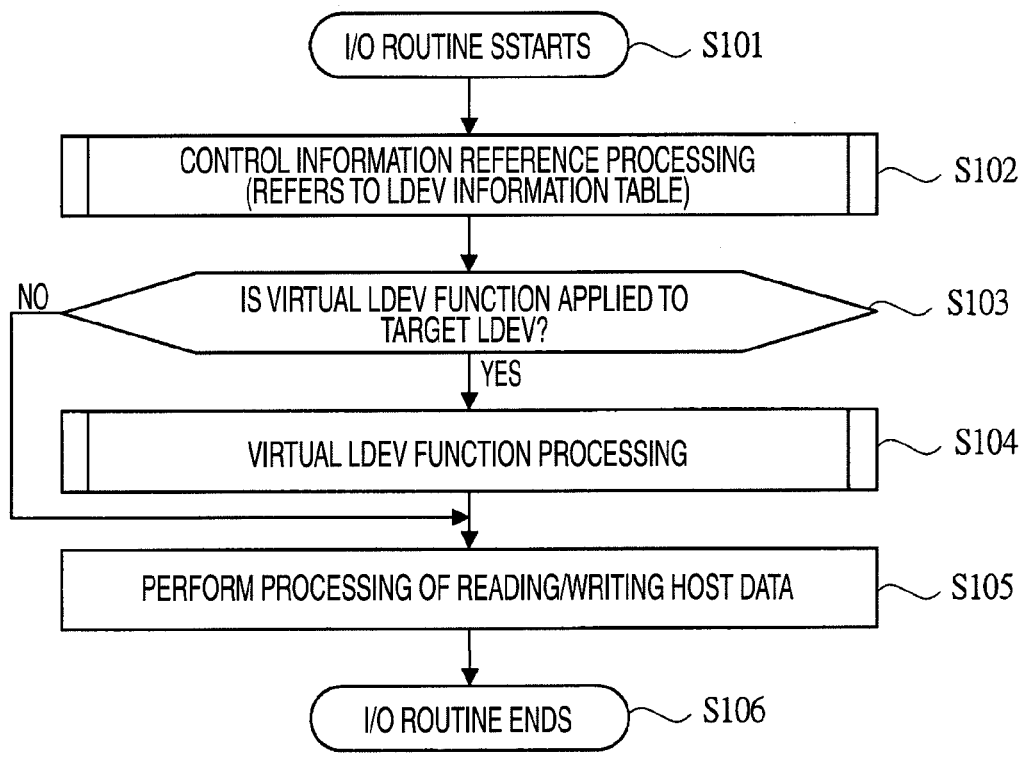
FIG. 13 is a diagram showing a configuration example of the path management table according to the first embodiment of the invention.
FIG. 14 is a flowchart illustrating an example of the operation in the I/O routine according to the first embodiment of the invention.

FIG. 13 is a diagram showing a configuration example of the path management table 4300, which is the control information 4000. The path management table 4300 has entries including a port number field 4301, a path name field 4302 and an LDEV number field 4303 for each of all defined access paths.

The port number field 4301 stores a port number of a port 1100. The port number is assigned to a host I/F 1610 on a one-to-one basis and is an SCSI port number designated when the host 2000 transmits an I/O request. The path name field 4302 stores a path name (such as an LUN of SCSI) defined for the host I/F 1610 indicated by the port number stored in the port number field 4301 of the same entry. The LDEV number field 4303 stores the host I/F 1610 indicated by the port number stored in the port number field 4301 of the same entry and the LDEV number of the LDEV 1500 corresponding to the path name stored in the path name field 4302.

[Processing Flow]

A processing flow of the routines by the control program 3000 in the storage system 1000 of this embodiment will be described below. FIG. 14 is a flowchart illustrating an example of the operation in the I/O routine 3100.

If the processing in the I/O routine 3100 starts (S101), the MP 1210 invokes control information reference processing of the control information access routine 3300, which will be described later, and refers the entries including the LDEV number included in the I/O request (which may be called "target LDEV number" hereinafter) in the LDEV number field 4101 on the LDEV information table 4100 (S102). The LDEV 1500 indicated by the target LDEV number and the LDEV address included in an I/O request may be called "target LDEV" and "target LDEV address", respectively.

Next, the MP 1210 determines whether an application relating to a virtual LDEV is applied to the target LDEV or not, that is, whether the target LDEV is a virtual LDEV or not (S103) from the applied application field 4102 of the entry corresponding to the target LDEV on the LDEV information table 4100 obtained in step S102.

If a virtual LDEV is included in the value stored in the applied application field 4102, virtual LDEV function processing in the application routine 3200, which will be described later, is invoked (S104), and the routine moves to step S105. The virtual LDEV function processing in step S104 converts the values of the target LDEV number (virtual LDEV number) and target LDEV address (virtual address) included in an I/O request to a real LDEV number and a real address, respectively. If the values stored in the applied application fields 4102 do not include a virtual LDEV, the routine moves to step S105 without processing.

In step S105, the MP 1210 obtains the physical address of the corresponding physical storage device 1720 from the target LDEV number and the target LDEV address and performs processing of reading/writing host data from/to the physical storage device 1720 (S105). In this case, processing of caching host data in the CM 1400 is carried out as required. Then, the processing in the I/O routine 3100 ends (S106).

Figure 15:
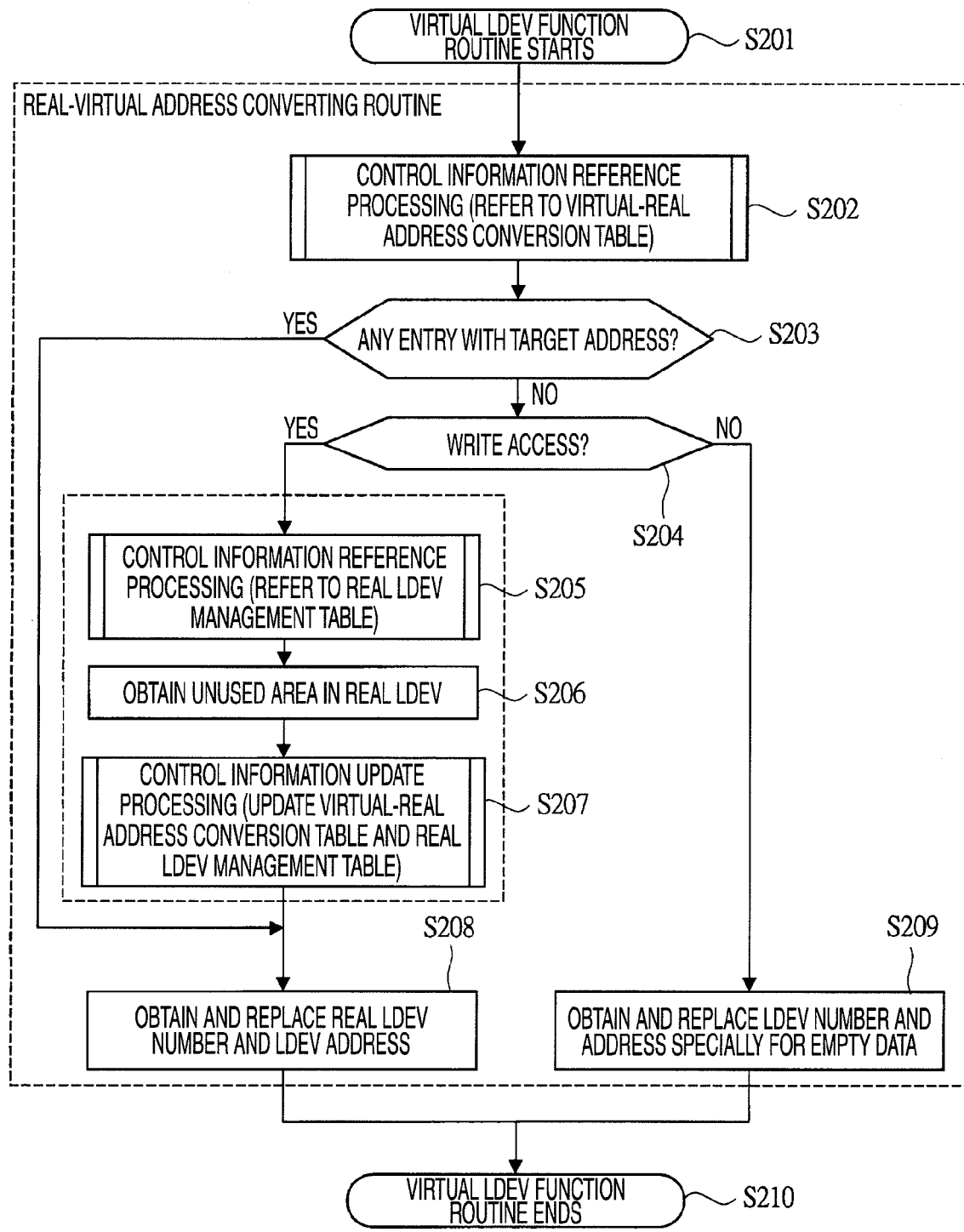
FIG. 15 is a flowchart illustrating an example of the operation in the virtual LDEV function routine of the application routine according to the first embodiment of the invention.

FIG. 15 is a flowchart illustrating an example of the operation in the virtual LDEV function routine 3210 of the application routine 3200.

If the MP 1210 starts the processing in the virtual LDEV function routine 3210 (S201), the processing in the virtual-real address converting routine 3211 is performed including first invoking control information reference processing in the control information access routine 3300 and referring to entries including the virtual address field 4422 corresponding to the target LDEV address on the virtual-real address conversion table 4420 (S202).

Next, whether the virtual-real address conversion table 4420 obtained in step S202 has entries including the virtual address fields 4422 corresponding to the target LDEV address or not is determined (S203). If not, the routine moves to step S204. If so, the routine moves to step S208.

The I/O request is determined as either read access or write access in step S204 (S204). If it is a write access, the routine moves to step S205 in order to newly allocate a real area.

If the I/O request is a read access, the LDEV number and LDEV address specially for empty data are obtained, and the value of the target LDEV number and target LDEV address of the I/O request are replaced by them (S209). Then, the virtual LDEV function routine ends (S210). If the LDEV number and LDEV address specially for empty data are set as the target LDEV number and target LDEV address, empty data is created and is returned to the host 2000 without actually accessing the physical storage device 1720 in step S105 in FIG. 14 as described above.

In step S205, the processing in the real area allocation routine 3212 is performed including first, invoking control information reference processing in the control information access routine 3300, which will be described later and referring to the real LDEV management table 4410 in order to allocate a real area (S205). Next, an unused area in the real LDEV 6210 is obtained on the basis of the real LDEV management table 4410 obtained in step S205 (S206). Next, control information update processing in the control information access routine 3300, which will be described later, is invoked, and the area obtained in step S206 is registered with virtual-real address conversion table 4420. Furthermore, the used capacity field 4413 of the entry corresponding to the real LDEV 6210 having the obtained area is updated on the real LDEV management table 4410 (S207). Then, the routine moves to step S208.

In step S208, the real LDEV number and real LDEV address of the entry on the virtual-real address conversion table 4420, which correspond to the target LDEV number and the target LDEV address, are obtained, and the values of the target LDEV number and target LDEV address in the I/O request are replaced by them (S208). Then, the processing in the virtual LDEV function routine 3210 ends (S210).

Figure 16:
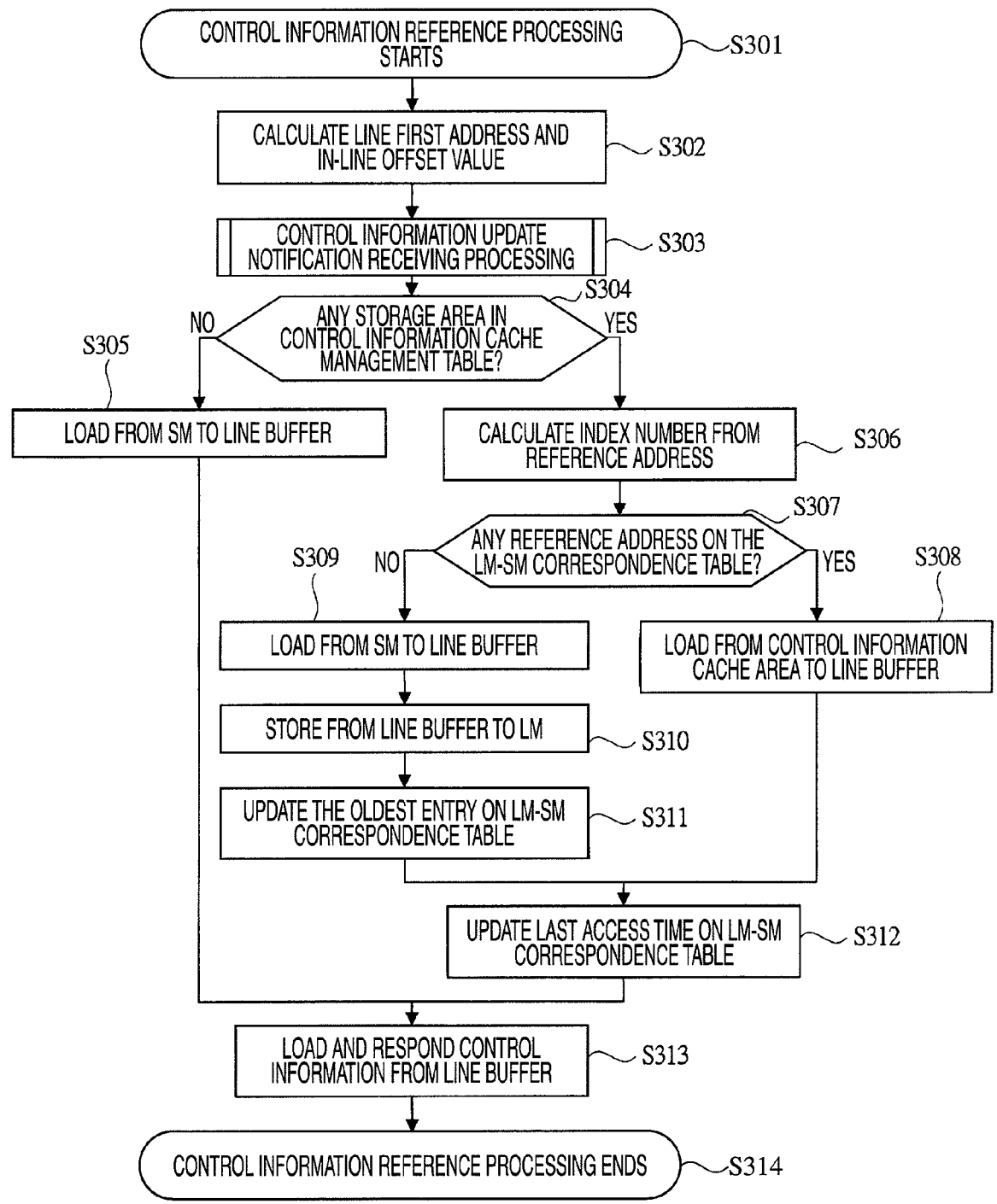
FIG. 16 is a flowchart illustrating an example of the operation of the control information reference processing in the control information access routine according to the first embodiment of the invention.

FIG. 16 is a flowchart illustrating an example of the operation of the control information reference processing in the control information access routine 3300. The control information reference processing is invoked along with the SM address to be referred from the I/O routine 3100 or application routine 3200.

If the control information reference processing in the control information access routine 3300 starts (S301), the MP 1210 first obtains the first SM address (which may be called "reference address" hereinafter) of the line including the target SM address and an in-line offset value (S302). The reference address can be obtained by subtracting the remainder of the division of the value of the SM address by the size of the line from the value of the SM address, for example. In this case, the in-line offset value is the remainder value. In the operation, the MP 1210 performs the processing by using a temporary storage area in a line size, which is called line buffer. The line buffer may be provided in the LM 1220.

Next, control information update notification receiving processing, which will be described later, is invoked. If an update notification is received for the control information from other MP 1210, the caching of the control information is invalidated (S303).

Next, the control information cache management table is referred, and whether the SM address range field 5222 stores a value in the storage area index number range field of the entry including the target SM address or not is determined, that is, whether any storage area exists in the LM 1220 corresponding to the target SM address or not is determined (S304). If so, it is determined that the target control information 4000 is to be cached, and the routine moves to step S306.

If no values are stored in the storage area index number range field 5223 in step S304, it is determined that the target SM address is not to be cached, and the routine moves to step S305. In step S305, a line is loaded from the SM 1300 to the line buffer on the basis of the reference address, and the routine moves to step S313 (S305).

In step S306, the index number of the storage area storing the target control information 4000 is calculated from the reference address and the value in the storage area index number range field 5223 of the corresponding entry on the control information cache management table 5220 (S306). A hash function, for example, can be used for a calculation.

Next, the LM-SM correspondence table 5210 corresponding to the index number calculated in step S306 is referred, and whether any entry exists including the reference address in the SM address field 5212 or not is determined (S307). If not, the routine moves to step S309.

If so in step S307, it is determined that the latest data has been cached, and the processing of loading from the SM 1300 is omitted. Then, a line is loaded from the control information cache area 5100 to the line buffer by using the LM address stored in the LM address field 5211 of the corresponding entry on the LM-SM correspondence table 5210 (S308). Then, the routine moves to step S312.

If no entries exist in step S307, it is determined that the latest data has not been cached, and the line is loaded to the line buffer with reference to the SM 1300 on the basis of the reference address (S309). Next, the line is stored from the line buffer to the storage area on the basis of the LM address stored in the LM address field 5211 of the oldest entry in time stored in the last access time field 5213 among the corresponding entries on the LM-SM correspondence table 5210 (S310). After that, the value of the SM address field 5212 of the target entry on the LM-SM correspondence table 5210 is updated with the value of the reference address (S311), and the routine moves to step S312.

In step S312, the value of the last access time field 5213 of the target entry on the LM-SM correspondence table 5210 is updated with the current time (S312), and the routine moves to step S313.

In step S313, the in-line offset value calculated in step S302 is used to load the control information 4000 from the line, and the loaded control information 4000 is responded to the I/O routine 3100 or application routine 3200, which has requested the loaded control information 4000 (S313). Then, the control information reference processing ends (S314).

Figure 17:
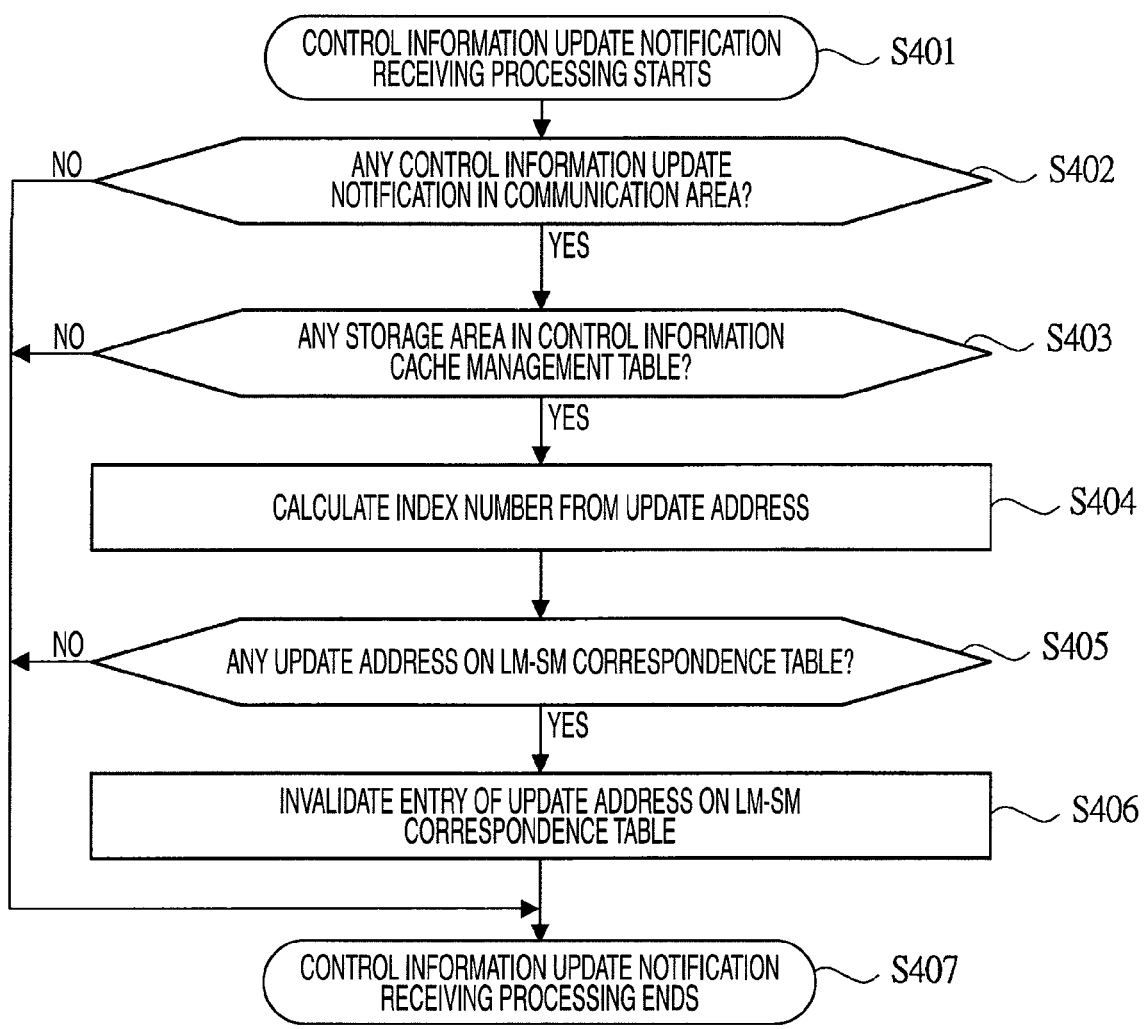
FIG. 17 is a flowchart illustrating an example of the operation of the control information update notification receiving processing in the control information access routine according to the first embodiment of the invention.

FIG. 17 is a flowchart illustrating an example of the operation of the control information update notification receiving processing in the control information access routine 3300.

If the control information update notification receiving processing in the control information access routine 3300 starts (S401), the MP 1210 first refers to the communication area 5300 in the LM 1220 and determines whether the communication area 5300 has any control information update notification or not (S402). If not, the control information update notification receiving processing ends without performing subsequent processing (S407).

If so in step S402, whether any value is stored in the storage area index number range field 5223 of the entry including the SM address included in the SM address range field in the control information update notification (which may be called "update address" hereinafter) or not, that is, whether any storage area corresponding to the update address exists or not is determined with reference to the control information cache management table 5220 (S403). If not, the control information update notification receiving processing ends without performing the subsequent processing (S407).

If so in step S403, the index number of the storage area storing the target control information 4000 is calculated from the update address and the storage area index number range field of the entry on the corresponding control information cache management table 5220 (S404). A hash function may be used for the calculation, for example, as described above.

Next, with reference to the LM-SM correspondence table corresponding to the index number, whether any entry exists which includes the update address in the SM address field 5212 or not is determined (S405). If not, the control information update notification receiving processing ends without performing the subsequent processing (S407).

If so, the values in the SM address field 5212 and last access time field 5213 of the entry on the LM-SM correspondence table 5210 are deleted and the entry is invalidated in step S406 (S406). Then, the control information update notification receiving processing ends (S407).

Figure 18:
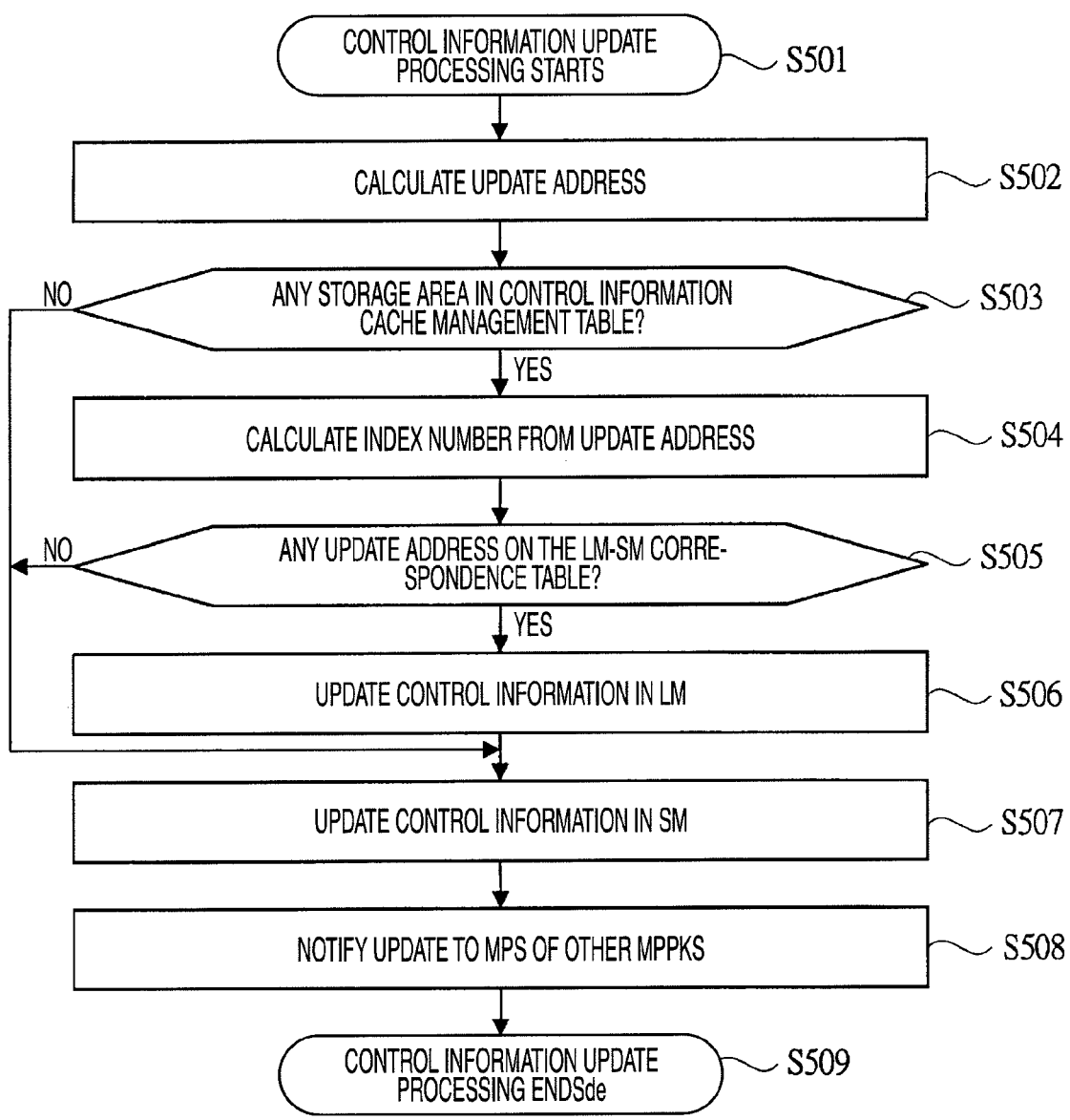
FIG. 18 is a flowchart illustrating an example of the operation of the control information update processing in the control information access routine according to the first embodiment of the invention.

FIG. 18 is a flowchart illustrating an example of the control information update processing in the control information access routine 3300. The control information update processing is invoked along with the SM address to be updated by the I/O routine 3100 or application routine 3200.

If the control information update processing in the control information access routine 3300 starts (S501), the MP 1210 first obtains the first SM address of the line including the target SM address (which may be called "update address" hereinafter) like the control information reference processing (S502).

Next, with reference to the control information cache management table 5220, whether any value is stored in the storage area index number range field 5223 of the entry in which the SM address range field 5222 includes the update address or not, that is, whether any storage area corresponding to the update address exists or not is determined (S503). If not, the routine moves to step S507.

If so in step S503, the index number of the storage area storing the target control information 4000 is calculated from the update address and the storage area index number range field 5223 of the entry on the corresponding control information cache management table 5220 (S504). A hash function may be used for the calculation, for example, as described above.

Next, with reference to the LM-SM correspondence table 5210 corresponding to the index number, whether any entry exists which includes the update address in the SM address field 5212 or not is determined (S505). If so, the control information 4000 in the control information cache area 5100 in the LM 1220 is updated on the basis of the LM address stored in the LM address field 5211 of the entry (S506). If not, the routine moves to step S507.

In step S507, the control information 4000 in the SM 1300 is updated on the basis of the update address (S507). Next, by writing the control information update notification to the communication area 5300 in the LM 1220 of the other MPPKs 1200, the MPs 1210 of the other MPPKs 1200 is notified the update of the control information 4000 (S508). Then, the control information update processing ends (S509).

The control information update notification includes the update address. The control information update notification may not be performed upon every update of the control information 4000 but may be notified collectively at an appropriate time (such as when a series of the steps of the I/O processing completes) by holding the notifications in a buffer, for example. The control information update notification may be omitted for the control information 4000 not to be cached, such as statistics information as described above.

Figure 19:
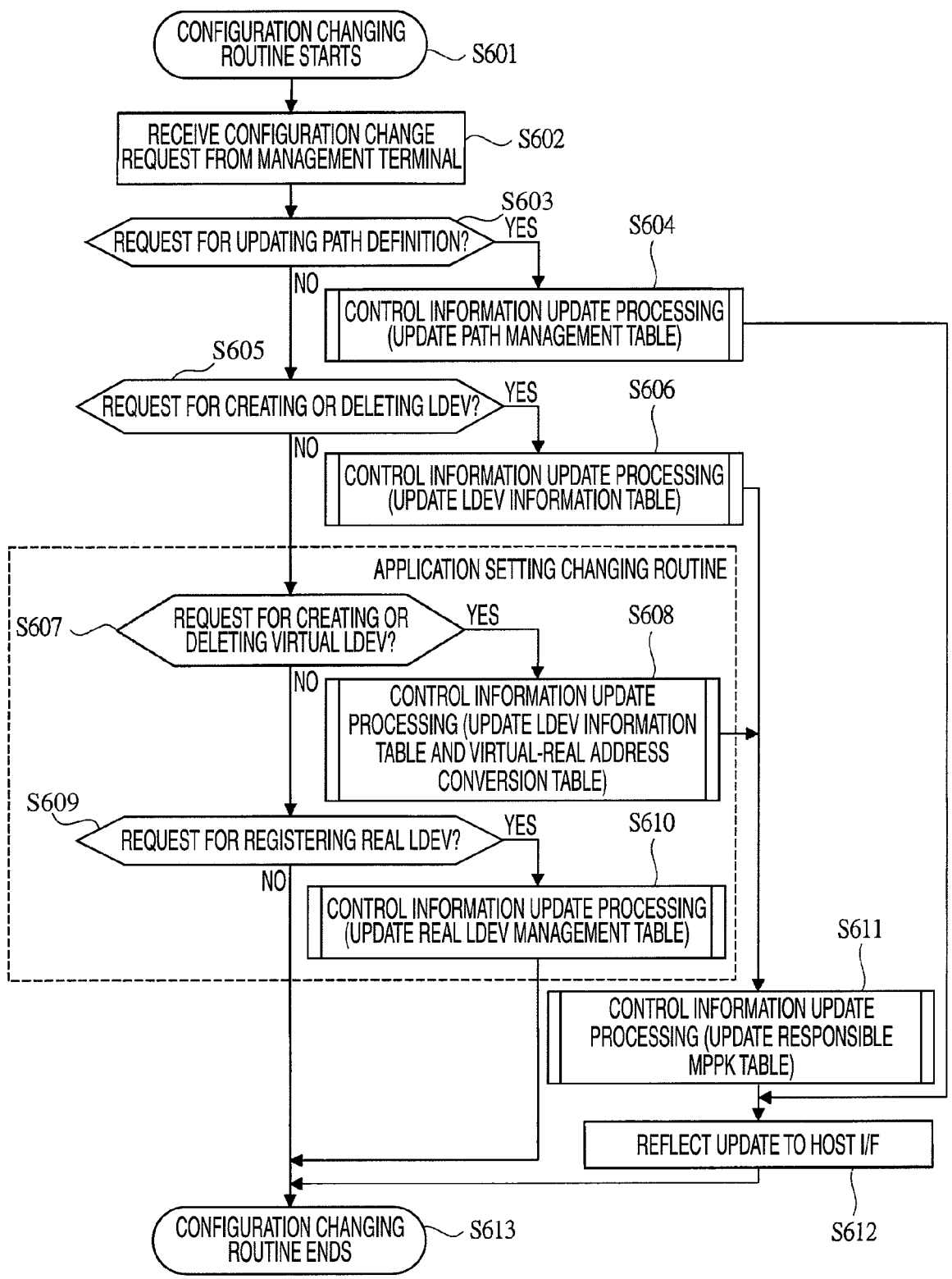
FIG. 19 is a flowchart illustrating an example of the operation in the configuration changing routine according to the first embodiment of the invention.

FIG. 19 is a flowchart illustrating an example of the operation in the configuration changing routine 3400.

If the processing in the configuration changing routine 3400 starts (S601), the MP 1210 first receives a configuration change request transmitted form the management terminal 2100 (S602). Next, the routine branches off in accordance with the type of the configuration change request (S603, S605, S607 or S609). If it is a request for updating a path definition, the routine moves to step S604. If it is a request for creating or deleting an LDEV, the routine moves to step S606. As the processing in the application setting changing routine 3410, if it is a request for creating or deleting a virtual LDEV, the routine moves to step S608. If it is a request for registering a real LDEV, the routine moves to step S610. If the configuration change request fits into none of them, the processing in the configuration changing routine 3400 ends (S613).

If the configuration change request is a request for updating a path definition, the control information update processing in the control information access routine 3300 as described above is invoked, and the path management table 4300 is updated (S604), and the routine moves to step S612. If the configuration change request is a request for creating or deleting an LDEV, the control information update processing of the control information access routine 3300 is invoked, and the LDEV information table 4100 is updated (S606). Furthermore, the responsible MPPK table 4200 is updated (S611), and the routine moves to step S612. The responsible MPPK of the created LDEV 1500 is determined by a round-robin system.

In step S612, by updating the tables in the buffer memory 1612 in the host I/Fs 1610, the updated data on the responsible MPPK table 4200 and path management table 4300 is reflected to the host I/Fs 1610 (S612). Then, the processing in the configuration changing routine 3400 ends (S613).

If the configuration change request is a request for creating or deleting a virtual LDEV, the control information update processing of the control information access routine 3300 is invoked, and the LDEV information table 4100 and virtual-real address conversion table 4420 are updated (S608). Then, the routine moves to step S611 where the responsible MPPK is defined. If the configuration change request is a request for registering a real LDEV 6300 to the pool 6200, the control information update processing of the control information access routine 3300 is invoked, and the real LDEV management table 4410 is updated (S610). Then, the processing in the configuration changing routine 3400 ends (S613).

As described above, in the storage system 1000 of this embodiment, by caching a part of the control information 4000 in the SM 1300 causing slow accesses to the LM 1220 allowing fact accesses and accessing it, the waiting time for the access to the control information 4000 can be reduced, and the processing performance of the system can be enhanced. Furthermore, by discriminating the control information 4000 into configuration dependent information which is accessed frequently and capacity dependent information which is not so to determine the necessity of caching or the storage area to cache it in the LM 1220, the LM hit probability about the control information 4000 which is accessed frequently can be enhanced, and the processing performance of the system can be enhanced.

Second Embodiment

The computer system which is a second embodiment of the invention will be described below. This embodiment is an example in a case where the size of the storage area to cache the control information 4000 in the LM 1220 is changed dynamically in accordance with the configuration change in the storage system 1000. Because the outline of the system configuration, hardware configuration and so on are similar to those in the first embodiment, the repetitive description thereon will be omitted.

[Control Program Configuration]

Figure 20:
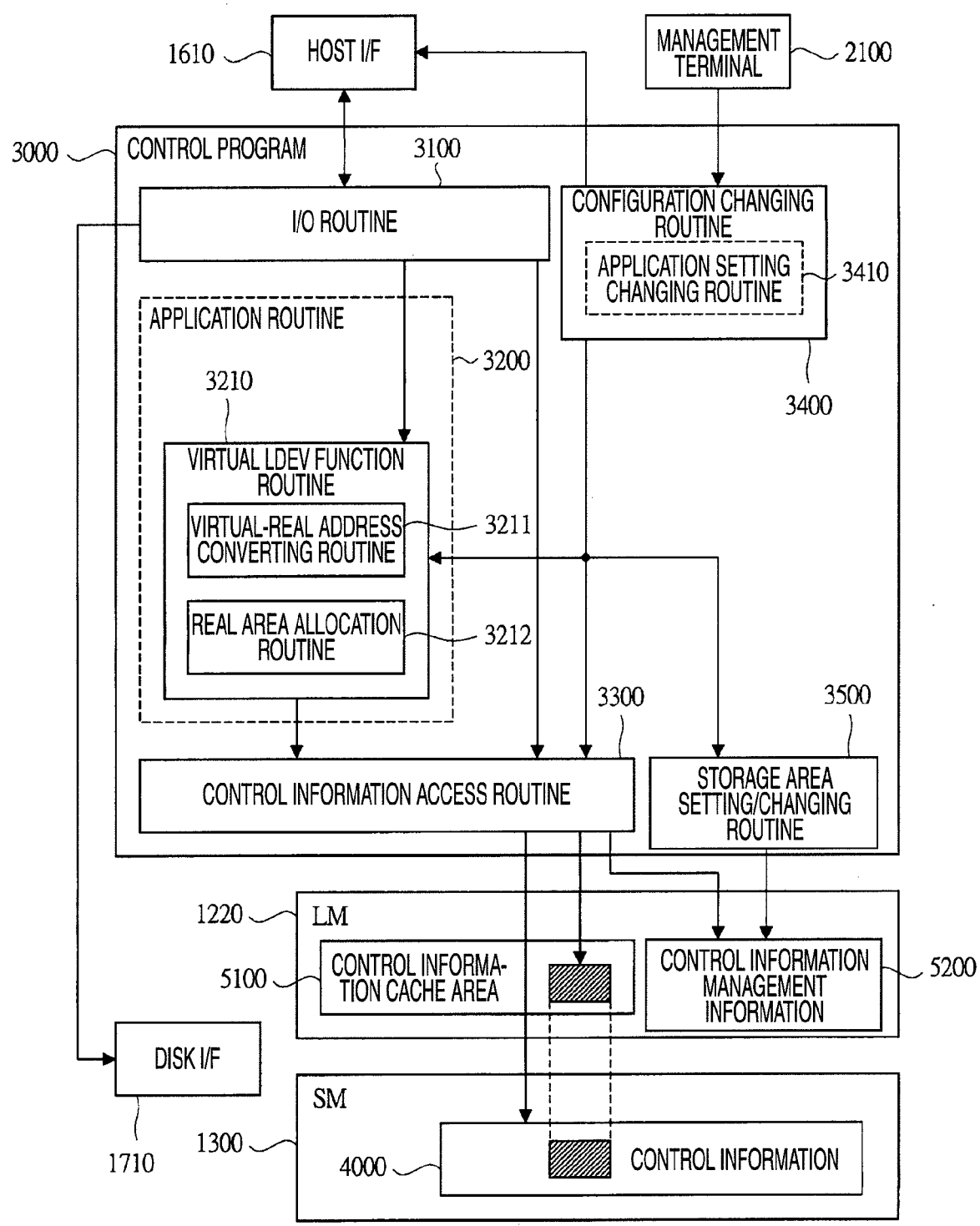
FIG. 20 is a diagram showing a configuration example of the control program according to a second embodiment of the invention.

FIG. 20 is a diagram showing a configuration example of a control program 3000 in the computer system of this embodiment. It is different from the configuration example of the control program 3000 in the first embodiment, which is described with reference to FIG. 4, in that it further includes a storage area setting/changing routine 3500. The storage area setting/changing routine 3500 provides a function for dynamically changing the size of the storage area in the LM 1220 for caching control information 4000 in accordance with the configuration change in the storage system 1000. Details of the storage area setting/changing routine 3500 will be described later.

[Control Information Configuration]

Figure 21:
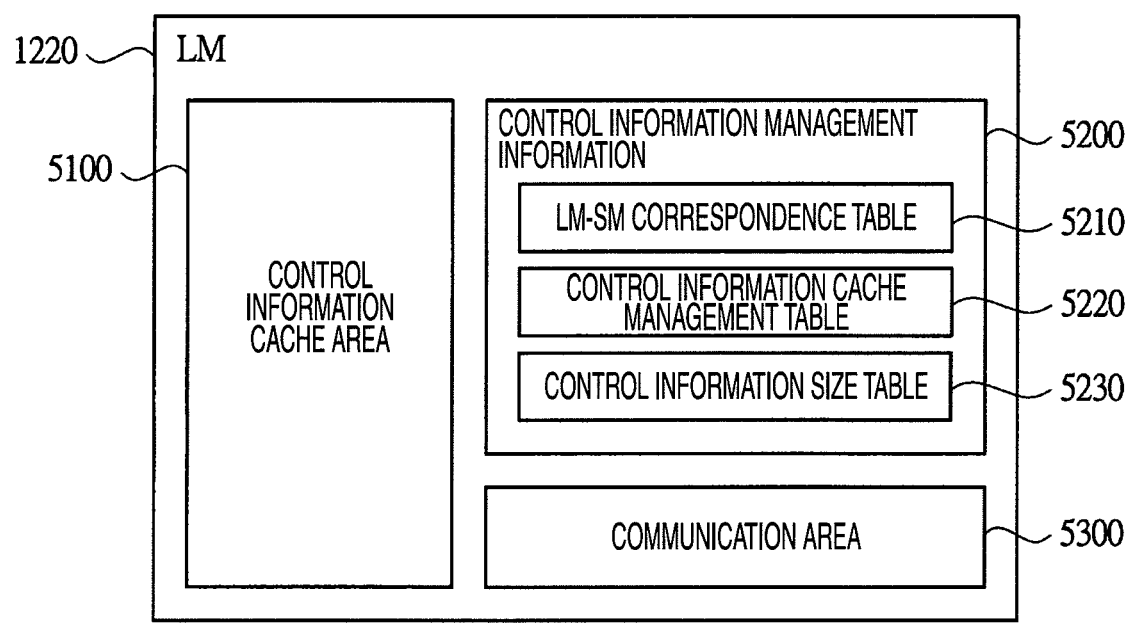
FIG. 21 is a diagram showing a configuration example of information in the LM according to the second embodiment of the invention.

FIG. 21 is a diagram showing a configuration example of information in the LM 1220. It is different from the one in the first embodiment, which is described with reference to FIG. 6, in that the control information management information 5200 further includes a control information size table 5230.

FIG. 22 is a diagram showing a configuration example of the control information size table 5230 which is the control information management information 5200. The control information size table 5230 has entries including a control information name field 5231, a configuration dependent information size field 5232, a capacity dependent information size field 5233, a used application field 5234 and an application applied status field 5235.

The control information name field 5231 stores a control information name for identifying a control information piece 4000. Also in this embodiment, like the first embodiment, the control information names are notated by characters for convenience of description. In the implementation, an ID assigned for identifying each piece of the control information 4000 may be set instead.

The configuration dependent information size field 5232 stores a value indicating the size for one unit of the configuration dependent information (which is an LDEV 1500 in the example in FIG. 22) in the control information 4000 indicated by the control information name stored in the control information name field 5231 of the same entry. The capacity dependent information size field 5233 stores a value indicating the size for one unit (which is a capacity of 256 KB in the example in FIG. 22) of capacity dependent information in the control information 4000 indicated by the control information name stored in the control information name field 5231 of the same entry.

The control information 4000 in the SM 1300 includes information not to be cached in the control information cache area 5100. For the control information 4000, no values may be stored in the configuration dependent information size field 5232 and capacity dependent information size field 5233. Thus, no storage areas are allocated in the control information cache area 5100, and the control information cache area 5100 can be used efficiently.

For the control information 4000, no values are stored in the storage area index number range field 5223 of the corresponding entry on the control information cache management table 5200 in the first embodiment, which is described with reference to FIG. 8. Therefore, it can be determined not to be cached in step S304 in the control information reference processing in the control information access routine 3300 described with reference to FIG. 16.

The used application field 5234 stores the type of an application that uses the control information piece 4000 indicated by the control information name stored in the control information name field 5231 of the same entry. Also in this embodiment, like the first embodiment, the name of an application is notated by characters for convenience of description. However, in the implementation, an ID, which is applied for identifying each application may be set, for example. In some cases, the control information 4000 may be used by multiple applications or may be used by all applications in common.

The application applied status field 5235 stores value indicating whether one or more LDEV 1500 exists or exist to which any of the applications stored in the used application field 5234 of the same entry is actually applied or not. For example, in the example in FIG. 22, if at least one LDEV 1500 exists to which the virtual LDEV function is actually applied, the application applied status field 5235 of the entry corresponding to the real LDEV management table 4410 and virtual-real address conversion table 4420, which are used by the virtual LDEV function, and the LDEV information table 4100 used by all applications stores the value (which is text data "applied" in the example in FIG. 22) indicating that the subject application is applied.

FIG. 23 is a diagram showing a configuration example of a storage area size table 5900. The storage area size table 5900 is temporarily created for storing results calculated by storage area size table calculation processing in the storage area setting/changing routine 3500, which will be described later, and is discarded after the storage area size table calculation processing. The storage area size table 5900 has entries including a control information name field 5901 and a storage area size field 5902 for all types of the control information 4000.

The control information name field 5901 stores a control information name for identifying control information 4000. The storage area size field 5902 stores a numerical value indicating the size of the storage area allocated in the control information cache area 5100 for the control information 4000 indicated by the control information name stored in the control information name field 5901 of the same entry.

[Processing Flow]

Processing flows of routines by the control program 3000 in the storage system 1000 of this embodiment will be described by focusing on the differences from those of the first embodiment.

Figure 24:
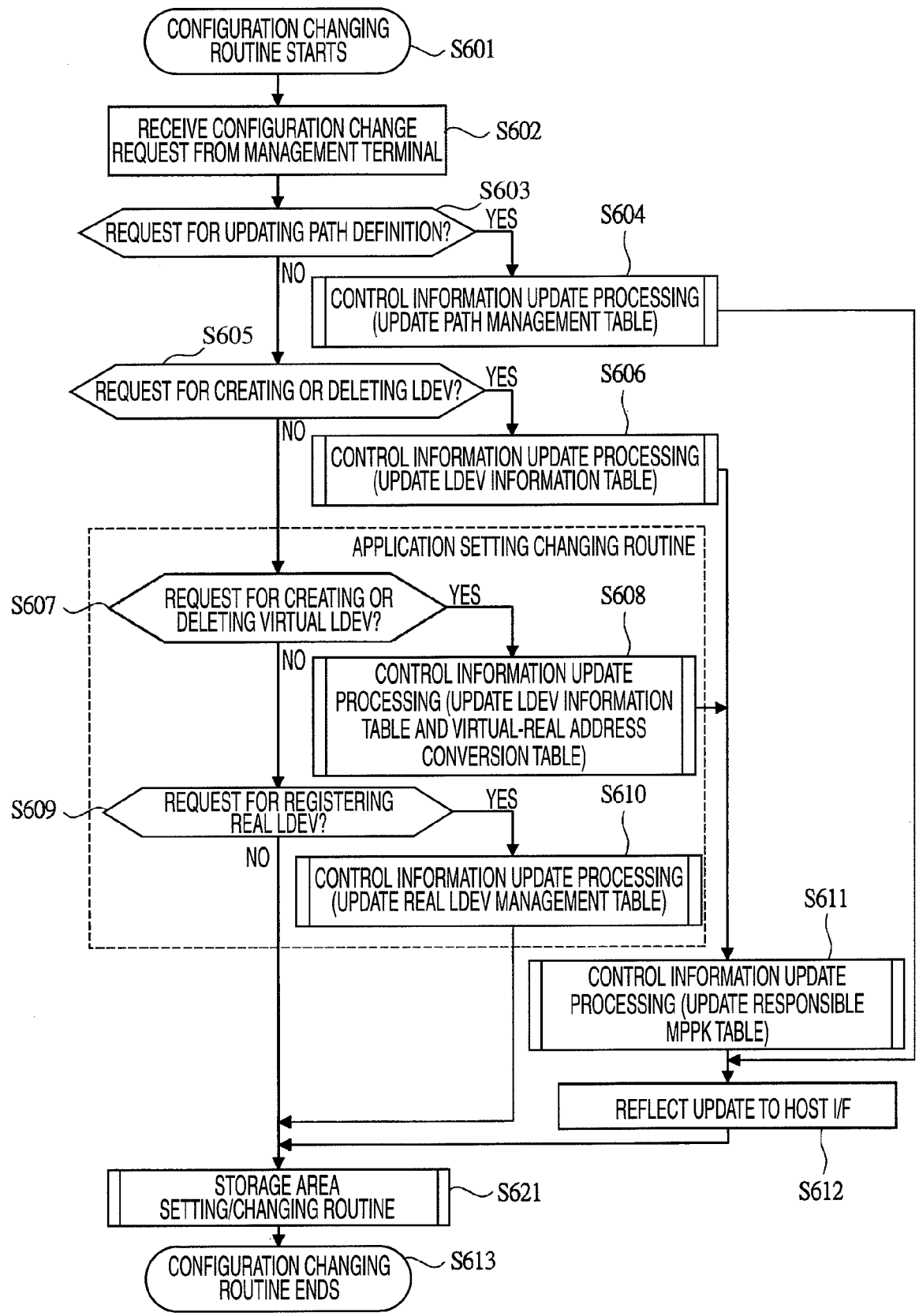
FIG. 24 is a flowchart illustrating an example of the operation of the configuration changing routine according to the second embodiment of the invention.

FIG. 24 is a flowchart illustrating an example of the operation of the configuration changing routine 3400. It is only different from the configuration changing routine of the first embodiment, which has been described with reference to FIG. 19, in that it further includes step S621. After the control information 4000 is updated by the processing to a configuration change request, the storage area setting/changing routine, which will be described later, is invoked, the storage area reserved in the control information cache area 5100 is changed in step S621 (S621).

Figure 25:
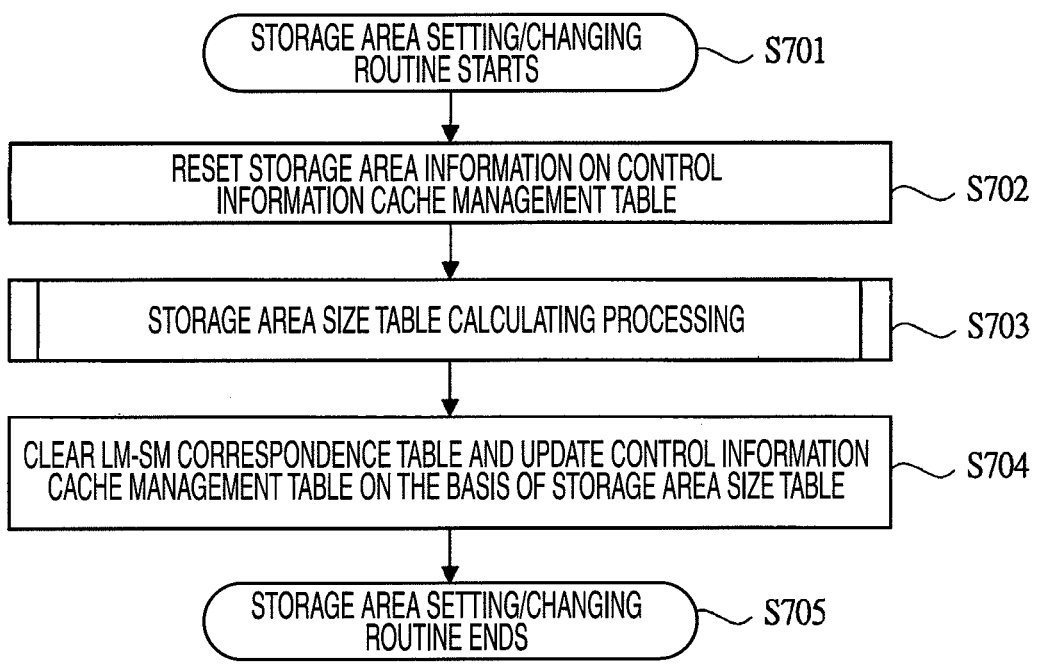
FIG. 25 is a flowchart illustrating an example of the operation of the storage area setting/changing routine in the configuration changing routine according to the second embodiment of the invention.

FIG. 25 is a flowchart illustrating an example of the operation of the storage area setting/changing routine in the configuration changing routine 3400.

If the storage area setting/changing routine in the configuration changing routine 3400 starts (S701), the MP 1210 first resets storage area information on the control information cache management table 5220 (or clears the storage area index number range fields 5223 of all entries) (S702). Next, the storage area size table calculation processing, which will be described later, is invoked, and the storage area size table 5900 is calculated and is created (S703). Next, all entries on the LM-SM correspondence table 5210 are cleared, and the value in the storage area index number range field 5223 on the control information cache management table 5220 is updated on the basis of the data in the storage area size table 5900 created in step S703 (S704). Then, the storage area setting/changing routine ends (S705).

Upon start of the storage system 1000, the storage area setting/changing routine in the configuration changing routine 3400 may be performed, and the value in the storage area index number range field 5223 on the control information cache management table 5220 may be newly redefined. Then, in accordance with the value, a storage area may be set. The data on the control information cache management table 5220 may be held by proper means also upon termination of the storage system 1000, and a storage area may be defined directly on the basis of the held value in the storage area index number range field 5223 on the control information cache management table 5220.

Figure 26:
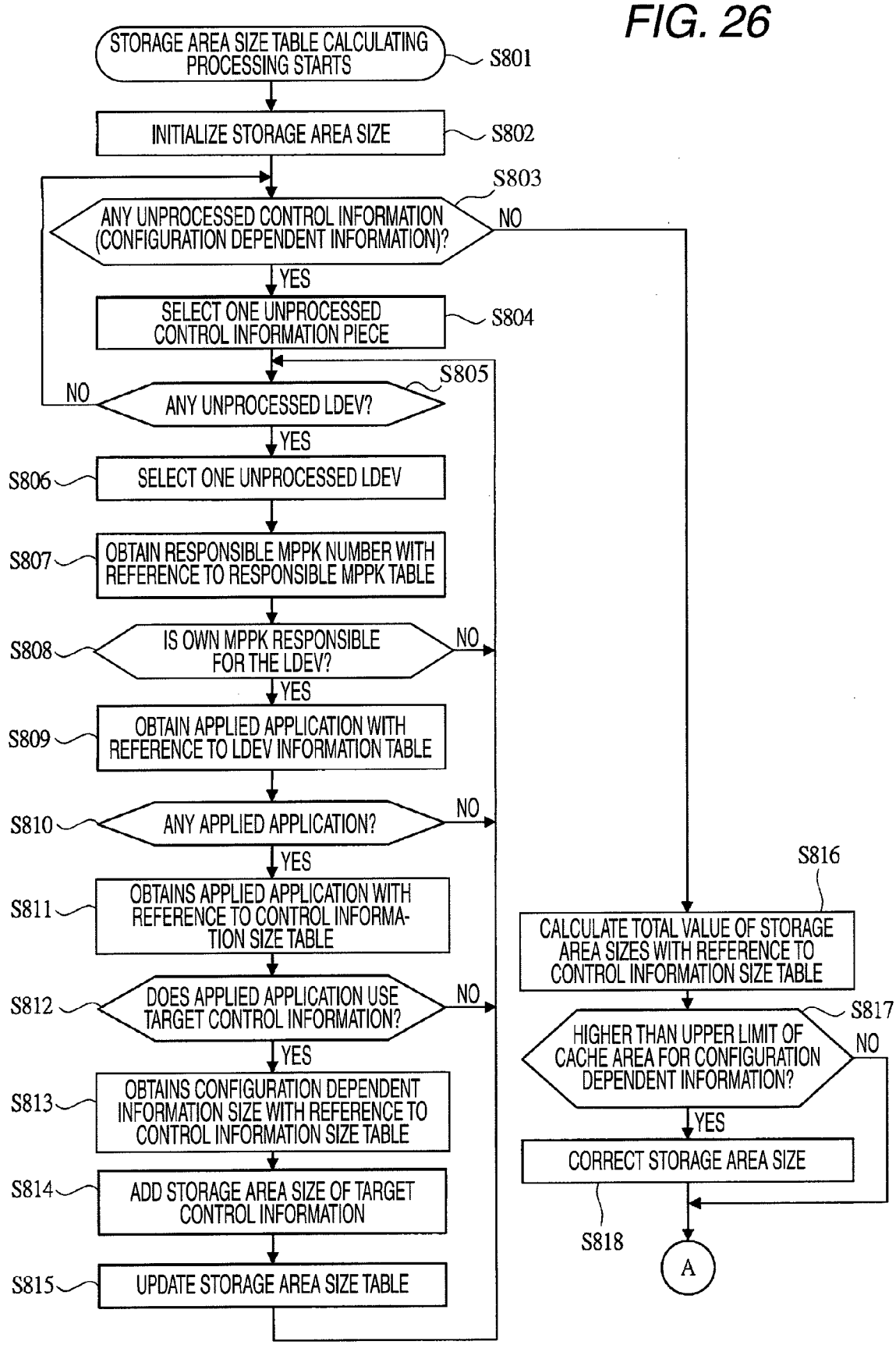
FIG. 26 is a flowchart illustrating an example of the first operation of the storage area size table calculating processing in the storage area setting/changing routine in the configuration changing routine according to the second embodiment of the invention.

FIG. 26 is a flowchart illustrating an example of a first operation of the storage area size table calculating processing in the storage area setting/changing routine in the configuration changing routine 3400. Here, the storage area size is first calculated for the configuration dependent information of the control information 4000.

If the storage area size table calculating processing starts (S801), the MP 1210 first initializes the storage area size table 5900 (S802). The storage area sizes are calculated for all configuration dependent information pieces to be cached of the control information 4000. In the example of this embodiment, the configuration dependent information may be the LDEV information table 4100 and the real LDEV management table 4410.

More specifically, whether any control information 4000 (which is configuration dependent information) exists for which the calculation of the storage area size has not been performed yet or not is determined (S803). Here, on the control information size table 5230, whether any of the control information 4000 specified by the values in the control information name field 5231 of the entries having the configuration dependent information size field 5232 storing values has not been processed yet or not is determined.

If not in step S803, the calculating processing for each piece of the control information 4000 ends, and the routine moves to step S816. If so, one piece of the control information 4000 among them is selected (S804), and the storage area sizes of all LDEV 1500 are calculated for the selected piece of control information 4000 subsequently.

More specifically, whether any of the LDEVs 1500 exists for which the calculation of the storage area size has not been performed or not is first determined (S805). In this case, whether any of the LDEVs 1500 specified by the LDEV number fields 4101 of the entries on the LDEV information table 4100 exists for which the calculation has not been performed or not is determined. If not, the calculation processing for the target control information piece 4000 ends, and the routine returns to step S803 where the calculation processing for the remaining pieces of the control information 4000 is performed. If so, one LDEV 1500 is selected among them (S806), and the storage area size for the selected LDEV 1500 is calculated.

With reference to the responsible MPPK table 4200, the responsible MPPK number 4202 for the target LDEV 1500 is first obtained (S807). Next, whether the obtained responsible MPPK number is matched with the MPPK number of the MPPK 1200 to which the MP 1210 in which the control program 3000 is operating belongs (which may be called "own MPPK") or not, that is, whether the target LDEV 1500 is the LDEV 1500 for which the own MPPK is responsible or not is determined (S808). If not, the calculating processing for the LDEV 1500 ends, and the routine returns to step S805 where the calculating processing is performed for the remaining LDEVs 1500.

If so in step S808, the value stored in the applied application field 4102 of the entry corresponding to the target LDEV 1500 is obtained with reference to the LDEV information table 4100 (S809). Next, whether any application is set in the obtained applied application field 4102 or not, that is, any application is applied for the target LDEV 1500 or not is determine (S810). If not, the calculating processing for the LDEV 1500 ends, and the routine returns to step S805 where the calculating processing is performed for the remaining LDEVs 1500.

If so in step S810, the value stored in the used application field 5234 of the entry corresponding to the target control information 4000 is obtained with reference to the control information size table 5230 (S811). Next, whether any application in the obtained used application field 5234 is matched with the applied application obtained in step S809 or not, that is, the application applied for the target LDEV 1500 uses the target control information 4000 or not is determined (S812). If not, the calculating processing for the LDEV 1500 ends, and the routine returns to step S805 where the calculating processing for the remaining LDEVs 1500 is performed.

If so in step S812, the size of the configuration dependent information stored in the configuration dependent information size field 5232 of the entry corresponding to the target control information 4000 is obtained with reference to the control information size table 5230 (S813). Next, with reference to the storage area size table 5900, the value stored in the storage area size field 5902 of the entry corresponding to the target control information 4000 is obtained, and the configuration dependent information size obtained in step S813 is added thereto (S814). Next, the obtained value is used to update the storage area size field 5902 of the entry corresponding to the target control information 4000 on the storage area size table 5900 (S815), and the routine returns to step S805 where the calculating processing is performed for the remaining LDEVs 1500.

In step S816 and subsequent steps, the storage area sizes obtained for the control information pieces 4000 (configuration dependent information pieces) are corrected. More specifically, with reference to the entries on the storage area size table 5900, the total value of the values stored in the storage area size fields 5902 is calculated (S816). Next, whether the obtained total value is higher than an upper limit value of the capacity of the control information cache area 5100 for configuration dependent information or not is determined (S817).

Here, the upper limit value of the capacity of the control information cache area 5100 for configuration dependent information may be specified by the absolute value of the size, the proportion of the capacity to the all capacity of the control information cache area 5100 or the like and can be held in the storage system 1000 by arbitrary means.

If not in step S817, the processing of calculating the storage area size for configuration dependent information ends (refer to the letter A in FIG. 26). If so, the storage area size is corrected to be under the upper limit value (S818).

The storage area size may be corrected to be small in size in proportion to the amount beyond the upper limit value on the basis of the ratio of the storage area size for each configuration dependent information with reference to the storage area size table 5900. A storage area size for information referred more highly frequently (such as LDEV information table 4100) may be reserved by priority among pieces of the configuration dependent information. The control information cache area 5100 desirably does not run out of the capacity with the configuration dependent information in order to reserve the storage area size for the capacity dependent information, which will be described later.

Figure 27:
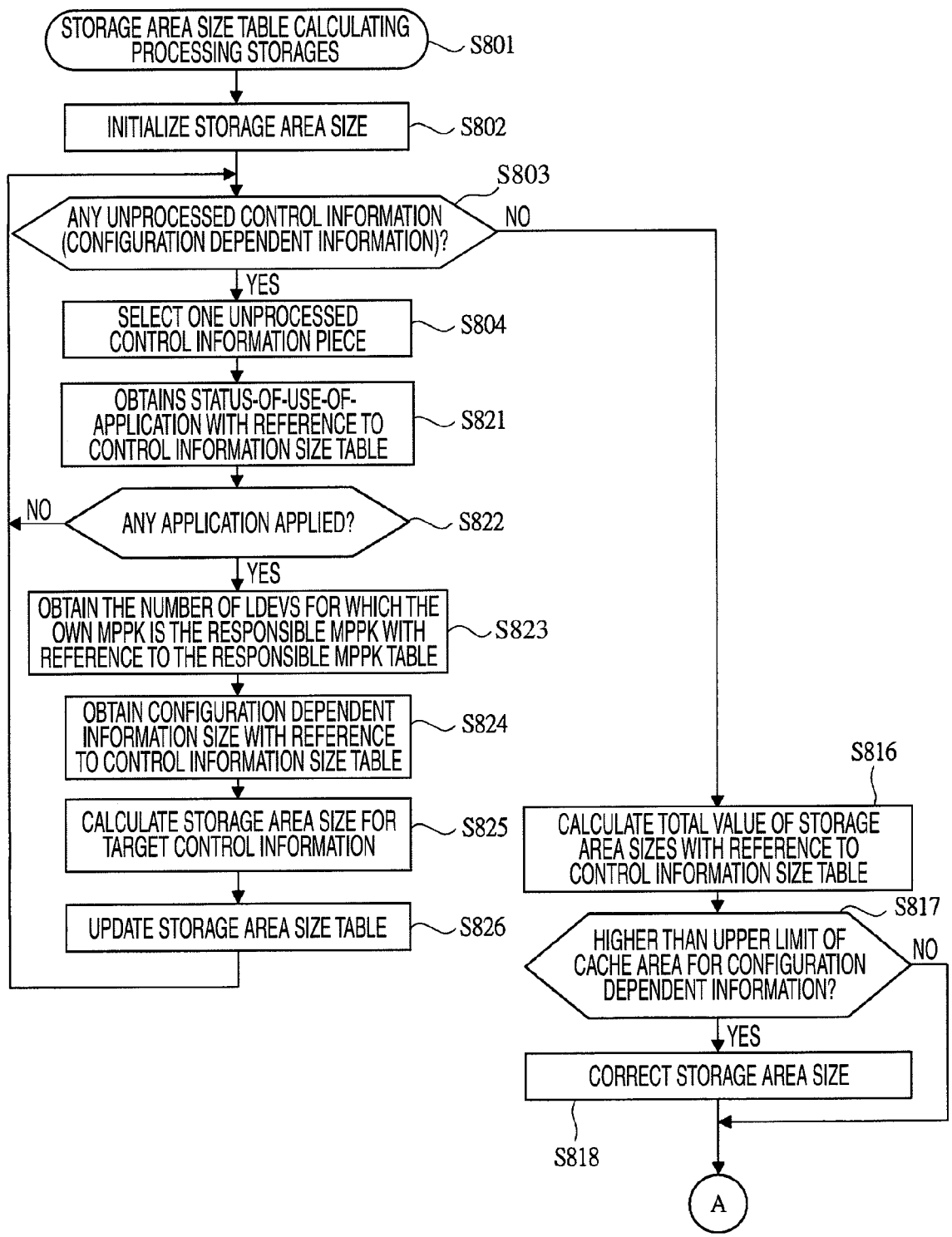
FIG. 27 is a flowchart illustrating an example of the second operation of the storage area size table calculating processing in the storage area setting/changing routine in the configuration changing routine according to the second embodiment of the invention.

FIG. 27 is a flowchart illustrating an example of a second operation of the storage area size table calculating processing in the storage area setting/changing routine in the configuration changing routine 3400. Referring to FIG. 27, like the one described with reference to FIG. 26, the storage area size is first calculated for the configuration dependent information of the control information 4000. The repetitive description on the initialization of the storage area size table 5900 in steps S801 to S804 in FIG. 26, the processing of selecting unprocessed control information 4000 and the processing of correcting the storage area sizes in steps S816 to S818 will be omitted because they are similar in the example in FIG. 27.

In the example in FIG. 27, with reference to the control information size table 5230, the value stored in the application applied status field 5235 of the entry corresponding to the target control information 4000 is obtained for the control information 4000 selected in step S804 (S821). Next, whether the obtained value in the application applied status field 5235 is the value indicating that any one of applications using the target control information 4000 is actually applied for one or more LDEVs 1500 or not is determined (S822). If not, the calculation processing for the target control information 4000 ends, and the routine returns to step S803 where the calculating processing is performed for the remaining control information pieces 4000.

If so in step S822, the number of LDEVs 1500 for which the own MPPK is the responsible MPPK is obtained with reference to the responsible MPPK table 4200 (S823). Next, with reference to the control information size table 5230, the size of the configuration dependent information stored in the configuration dependent information size field 5232 is obtained from the entry corresponding to the target control information 4000 (S824).

Next, the number of LDEVs 1500 for which the own MPPK is the responsible MPPK, which is obtained in step S823, and the size of the configuration dependent information of the target control information 4000, which is obtained in step S824 are multiplied to calculate the storage area size (S825). Next, the obtained value is used to update the storage area size field 5902 of the entry corresponding to the target control information 4000 on the storage area size table 5900 (S826). Then, the routine returns to step S803 where the calculating processing is performed for the remaining control information pieces 4000.

As described above, the area of the control information cache area 5100 can be used efficiently without wastage because the storage area can be reserved in the size based on the number of LDEVs 1500 for which applications actually using the target control information 4000 is applied in the processing of calculating the storage area size for the configuration dependent information, which has been described with reference to FIG. 26. However, the processing requires the reference to the LDEV information table 4100 for each LDEV 1500 and is therefore complicated to some extent.

In the processing of calculating the storage area size for the configuration dependent information, which has been described with reference to FIG. 27 on the other hand, if at least one LDEV 1500 applied an application actually using the target control information 4000, the efficiency of use of the area of the control information cache area 5100 decreases because the storage area is reserved in the size based on the number of all LDEVs 1500. However, the processing is not necessary for each of the LDEVs 1500, which eliminates the reference to the LDEV information table 4100. Therefore, the speed of the calculating processing can be increased.

While the storage area is reserved in the size based on the number of all LDEVs 1500 in the example in FIG. 27, the storage area in the size based on the number of licenses of the LDEV 1500 which can use an applied application, for example.

Figure 28:
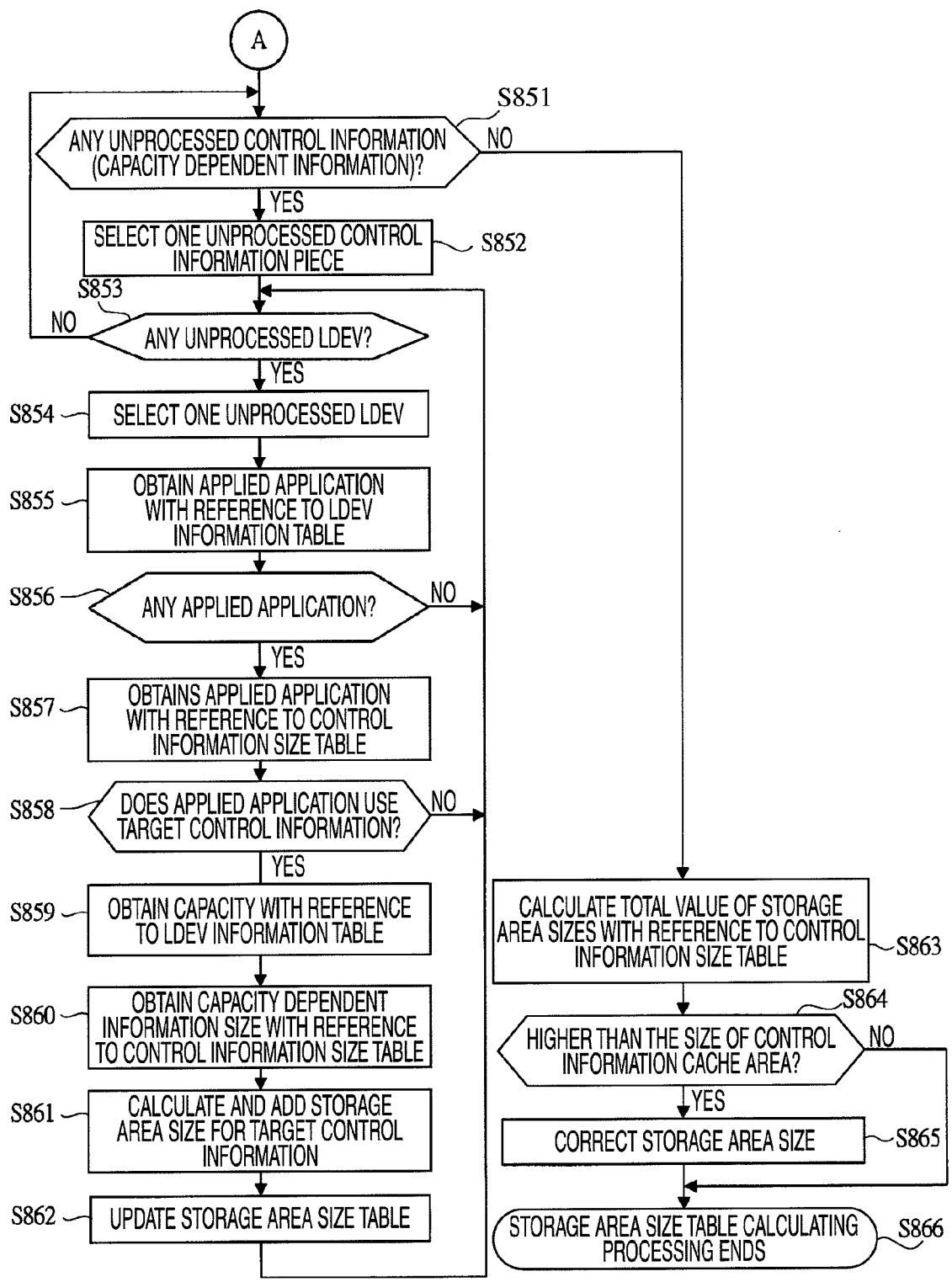
FIG. 28 is a flowchart continued from the steps in the example of the operation of the storage area size table calculating processing in the storage area setting/changing routine in the configuration changing routine according to the second embodiment of the invention.

FIG. 28 is a flowchart continued from the steps in the example of the operation of the storage area size table calculating processing in the storage area setting/changing routine in the configuration changing routine 3400. In this case, subsequently to the processing of calculating the storage area size for configuration dependent information in FIG. 26 or 27 as described above, a storage area size for capacity dependent information of the control information 4000 is calculated.

Subsequently to the processing of calculating the storage area size for configuration dependent information (refer to the letter A in FIG. 28), the storage area size is calculated for each of all capacity dependent information pieces to be cached of the control information 4000. In the example of this embodiment, the capacity dependent information may correspond to the virtual-real address conversion table 4420.

More specifically, whether any control information 4000 (which is capacity dependent information) exists for which the calculation of the storage area size has not been performed yet or not is determined (S851). In this case, like the case of the configuration dependent information described with reference to FIG. 26, whether any control information piece 4000 identified by the value in the control information name field 5231 of the entry having the capacity dependent information size field 5233 storing a value is unprocessed on the control information size table 5230 or not is determined.

If not in step S851, the processing of calculating for each of the control information pieces 4000 ends, and the routine moves to step S863. If so, one of the control information pieces 4000 is selected (S852), and the storage area sizes in all of the LDEVs 1500 are then calculated for the selected control information piece 4000.

More specifically, whether any LDEV 1500 exists for which the calculation of the storage area size has not been performed yet or not is determined (S853). Also in this case like the case of the configuration dependent information described with reference to FIG. 26, whether any LDEV 1500 identified by the values in the LDEV number field 4101 of the entries on the LDEV information table 4100 exists for which the calculation has not been performed yet or not is determined. If not, the processing of calculating for the target control information piece 4000 ends, and the routine returns to step S851 where the processing of calculating for the remaining control information pieces 4000 is performed. If so, one of the LDEVs 1500 is selected (S854), and the storage area size is calculated for the selected LDEV 1500.

First of all, with reference to the LDEV information table 4100, the value stored in the used application field 4102 of the entry corresponding to the target LDEV 1500 is obtained (S855). Next, whether any application is set in the obtained applied application field 4102 or not, that is, any application is applied for the target LDEV 1500 or not is determined (S856). If not, the processing of calculating for the LDEV 1500 ends, and the routine returns to step S853 where the processing of calculating for the remaining LDEVs 1500 is performed.

If so in step S856, the value stored in the used application field 5234 of the entry corresponding to the target control information piece 4000 is obtained with reference to the control information size table 5230 (S857). Next, whether any of the obtained values in the used application fields 5234 is matched with the applied application obtained in step S855 or not, that is, whether the application applied for the target LDEV 1500 uses the target control information piece 4000 or not is determined (S858). If not, the processing of calculating for the LDEV 1500 ends, and the routine returns to step S853 where the processing of calculating is performed for the remaining LDEVs 1500.

If so in step S858, the value stored in the capacity field 4103 of the entry corresponding to the target LDEV 1500 is obtained with reference to the LDEV information table 4100 (S859). Next, with reference to the control information size table 5230, the size of the capacity dependent information stored in the capacity dependent information size field 5233 of the entry corresponding to the target control information piece 4000 is obtained (S860).

Next, the value of the capacity of the target LDEV 1500, which is obtained in step S859, and the size of the capacity dependent information of the target control information piece 4000, which is obtained in step S860, are multiplied to calculate the storage area size. With reference to the storage area size table 5900, the value stored in the storage area size field 5902 of the entry corresponding to the target control information piece 4000 is obtained, and the calculated capacity dependent information size is added to the value (S861). Next, the obtained value is used to update the storage area size field 5902 of the entry corresponding to the target control information piece 4000 of the storage area size table 5900 (S862), and the routine returns to step S853 where the processing of calculating is performed for the remaining LDEVs 1500.

In step S863 and subsequent steps, the storage area sizes obtained for the control information pieces 4000 (capacity dependent information pieces) are corrected. More specifically, with reference to the entries on the storage area size table 5900, the total value of the values stored in the storage area size fields 5902 is calculated (S863). Next, whether the obtained total value exceeds the size of the control information cache area 5100 or not is determined (S864).

If not in step S864, the storage area size table calculating processing ends (S866). If so, correction is performed such that the storage area size can be under the size of the control information cache area 5100 (S865), and the storage area size table calculating processing ends (S866). The correction may be performed by reducing the size in proportion to the amount beyond the size of the control information cache area 5100 on the basis of the ratio of the storage area size for each capacity dependent information.

A shared storage area for capacity dependent information may be reserved on the basis of all capacity dependent information pieces, without reserving a storage area for each of the capacity dependent information. For example, in a case where the virtual LDEV function is used and the capacity used by the real LDEV 6210 is extremely small, the virtual-real address conversion table 4420 does not hold a large amount of information. Therefore, the reservation of a storage area in proportion to the capacity of the virtual LDEVs 6100 in the control information cache area 5100 may reduce the efficiency of use of the area of the control information cache area 5100.

Accordingly, by reserving a shared storage area on the basis of all capacity dependent information pieces, instead of the reservation of a storage area for each of capacity dependent information pieces, the situation as described above can be prevented, and the area of the control information cache area 5100 can be used efficiently.

As described above, in the storage system 1000 of this embodiment, the storage area size in the control information cache area 5100 can be changed dynamically in accordance with the change in configuration or setting of the storage system 1000. This can increase the efficiency of use of the area of the control information cache area 5100 in the LM 1220.

Third Embodiment

The computer system which is a third embodiment of the invention will be described below. This embodiment is an example in a case where management information on control information pieces 4000 is displayed on a management terminal 2100. Because the outline of the system configuration, hardware configuration and so on are similar to those in the first embodiment, the repetitive description thereon will be omitted.

Figure 29:
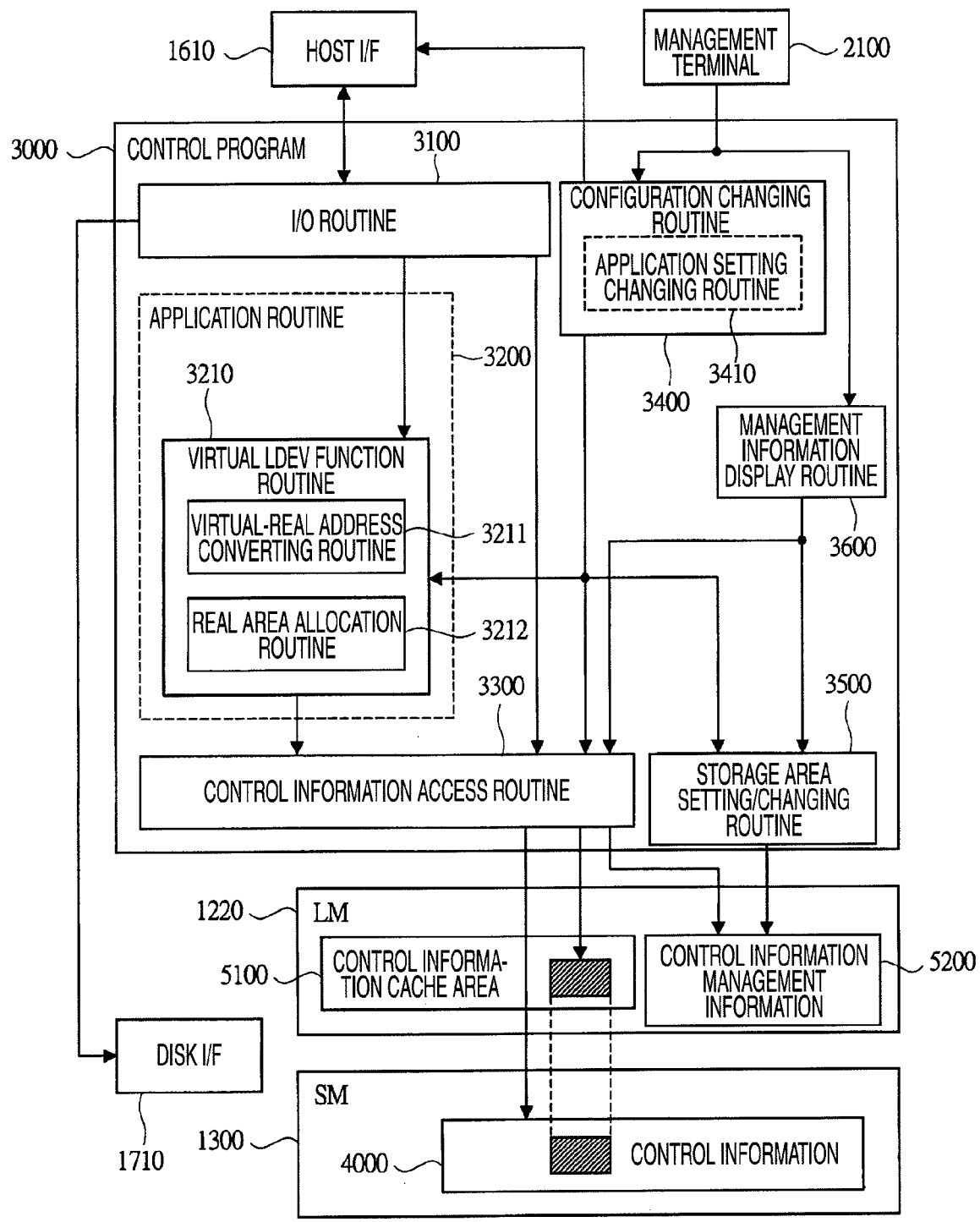
FIG. 29 is a diagram showing a configuration example of the control program in the computer system according to a third embodiment of the invention.

FIG. 29 is a diagram showing a configuration example of a control program 3000 in the computer system of this embodiment. It is different from the configuration example of the control program 3000 of the second embodiment, which has been described with reference to FIG. 20, in that it further includes a management information display routine 3600. The management information display routine 3600 provides functions of receiving a management information display request transmitted by the management terminal 2100, obtaining management information on control information 4000, and displaying it on the management terminal 2100.

Figure 30:
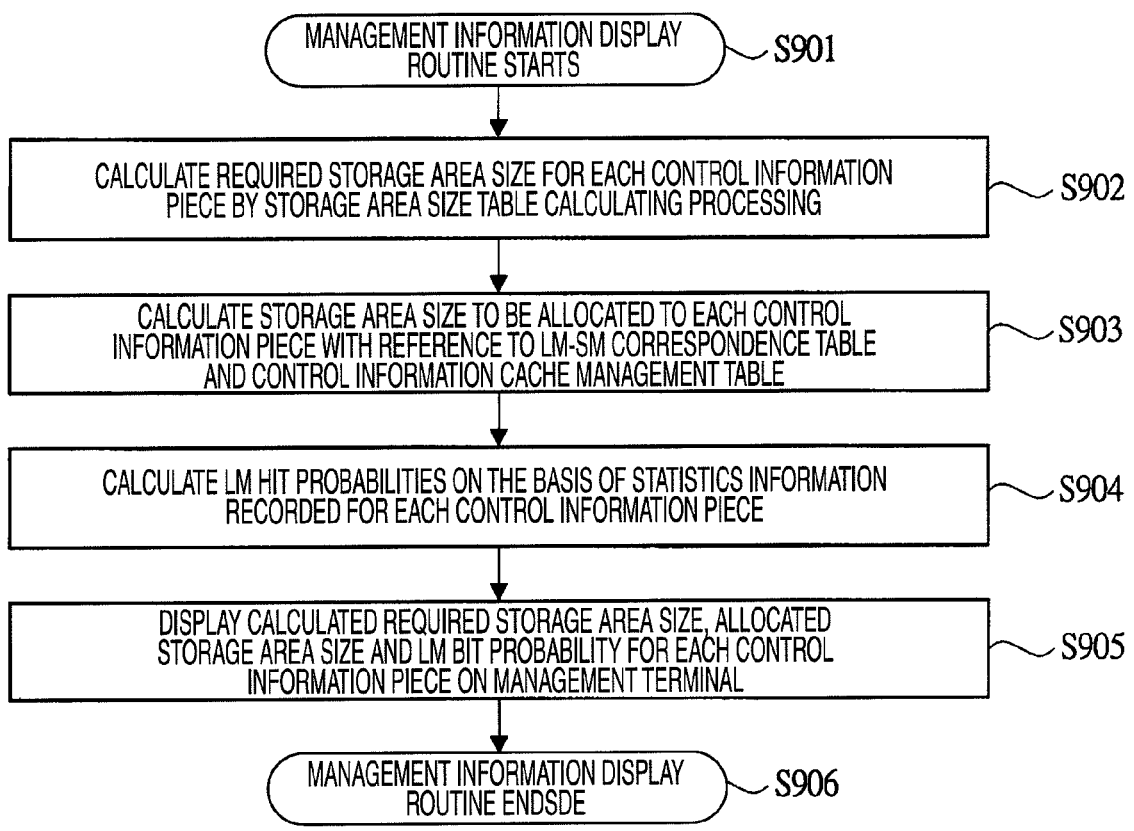
FIG. 30 is a flowchart illustrating an example of the operation of the management information display routine according to the third embodiment of the invention.

FIG. 30 is a flowchart illustrating an example of the operation of the management information display routine 3600.

In response to the reception of a management information display request from the management terminal 2100, the MP 1210 starts the management information display routine (S901). First of all, processing is invoked including the processing of calculating a storage area size for configuration dependent information excluding the processing of correcting the storage area size in steps S816 to S818 in FIG. 26 or 27 and the processing of calculating a storage area size for capacity dependent information excluding the processing of correcting a storage area size in steps S863 to S865 in FIG. 28 of the storage area size table calculating processing of the second embodiment, which is described with reference to FIGS. 26 to 28. Then, the required amount of the storage area size for each control information piece 4000 (which may be called required storage area size) is calculated (S902).

Because the processing of correcting a storage area size of the storage area size table calculating processing in the storage area setting/changing routine 3500 is excluded, the required amount of the storage area size for each control information piece 4000 can be calculated. The calculated total required amount of the storage area size is possibly larger than the total capacity of the total amount of the control information cache area 5100.

Next, with reference to the LM-SM correspondence table 5210 and control information cache management table 5220, the amount of storage area size to be allocated to each control information piece 4000 (which may be called allocated storage area size) is calculated on the basis of the value stored in the storage area index number range field 5223 of the entry corresponding to each control information piece 4000 on the control information cache management table 5220 and the value stored in the LM address field 5211 on the LM-SM correspondence table 5210 (S903).

Next, the LM hit probability for each control information piece 4000 is calculated on the basis of the statistics information including the number of I/O requests from the host 2000 as another control information piece 4000 (S904). The LM hit probability can be obtained by recording as statistics information the number of LM hits (branch to Yes in step S307) and the number of LM misses (branch to No in step S307) and periodically accumulating and/or initializing them in the control information reference routine of the embodiment 1, which has been described in FIG. 16, for example.

Next, the required storage area size for each control information piece 4000, which is calculated in step S902, the allocated storage area size for each control information piece 4000, which is calculated in step S903, and the LM hit probability for each control information piece 4000, which is calculated in step S904, are displayed on the management terminal 2100 as management information (S905). Then, the management information display routine ends (S906).

Figure 31:
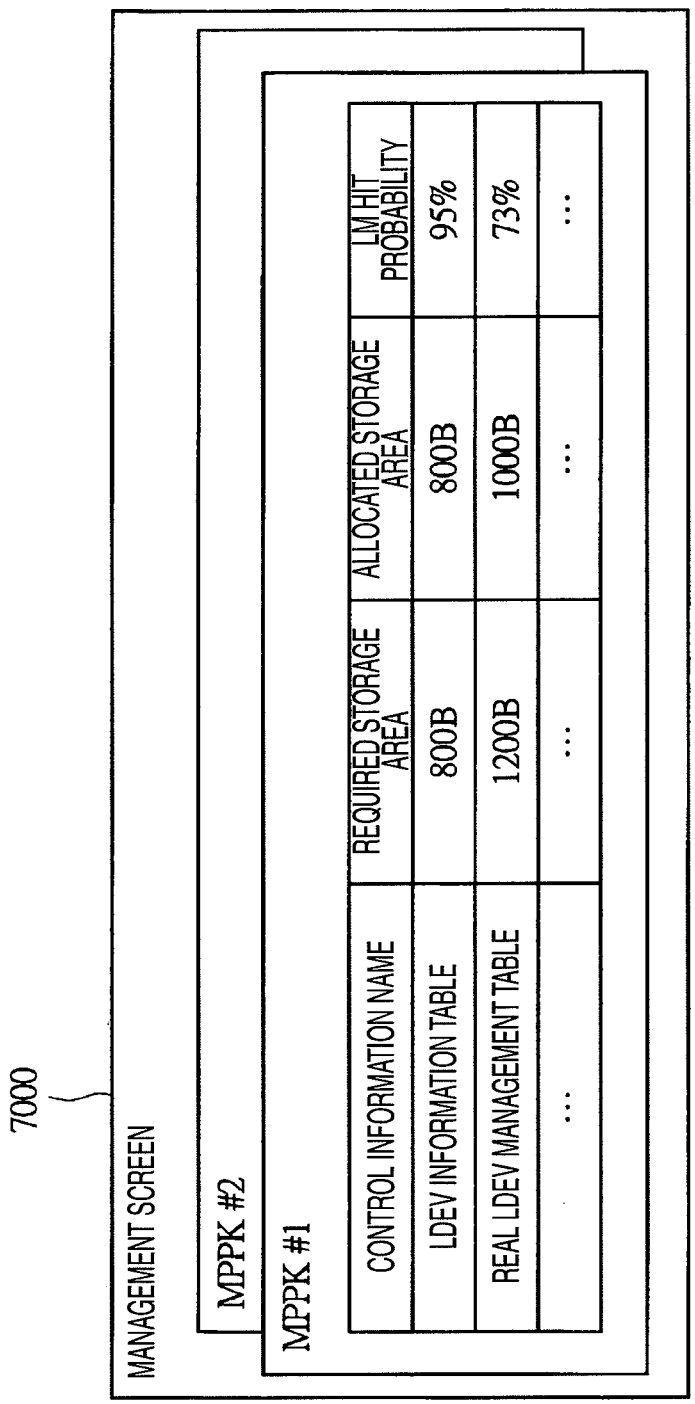
FIG. 31 is a diagram showing an example of the management screen displaying management information for control information pieces on a management terminal according to the third embodiment of the invention.

FIG. 31 is a diagram showing an example of the management screen displaying management information for control information pieces 4000 on the management terminal 2100. The management screen 7000 displays frames representing MPPKs 1200, each of which contains the display of the required storage area size, allocated storage area size, LM hit probability and so on for each control information piece 4000 in the target MPPK 1200. In order to allow the setting for prioritizing the performance of a specific application, for example, the size of the storage area to be allocated to the control information piece 4000 to be used by an application may be changed by prompting a manager to input the storage area size to be allocated to each control information piece 4000 on the management screen 7000.

The LDEV 1500 having a larger capacity used by an LM 1220 and providing a decreased LM hit probability may be moved from the responsible MPPK 1200 to another MPPK 1200, which can prevent the bias of the used capacity by the LMs 1220 among the MPPKs 1200 and can increase the efficiency of use. A program operating in the management terminal 2100 may be used to calculate the combination of an LDEV 1500 and the responsible MPPK, which can provide a reduced bias of the used capacity by LMs 1220 among the MPPKs 1200 and present it to a manager.

As described above, the storage system 1000 of this embodiment displays management information on each control information piece 4000 on the management terminal 2100. Thus, a manager can refer to the management information and is allowed the optimum setting of the storage area size of the control information cache area 5100 in an LM 1220, which can increase the efficiency of use of the control information cache area 5100, with the configuration changing routine 3400 of the second embodiment.

Fourth Embodiment

The computer system which is a fourth embodiment of the invention will be described below. This embodiment is an example in a case where the update notification to other MPPKs 1200 with the update of control information 4000 is omitted. Because the outline of the system configuration, hardware configuration, the control program configuration and so on are similar to those in the first to third embodiments, the repetitive description thereon will be omitted.

FIG. 32 is a diagram showing a configuration example of the control information cache management table 5220, which is control information management information 5200. It is different from the one of the first embodiment, which has been described with reference to FIG. 8, in that it further includes an exclusive use flag field 5224.

The exclusive use flag field 5224 is a flag indicating whether each information piece of control information 4000 indicated by the control information name field 5221 of the same entry is the control information piece 4000 which is exclusively used by a specific MPPK 1200 (such as "1": exclusively used by a specific MPPK 1200 and "0": used by multiple MPPKs 1200).

For example, in the storage system 1000 of this embodiment, each entry on the virtual-real address conversion table 4420 is information to be accessed by a responsible MPPK for the virtual LDEV 6200 indicated by the LDEV number stored in the virtual LDEV number field 4421 of the entry. Therefore, in the example in FIG. 32, "1" is stored in the exclusive use flag field 5224 of the entry corresponding to the virtual-real address conversion table 4420 on the control information cache management table 5220.

Figure 33:
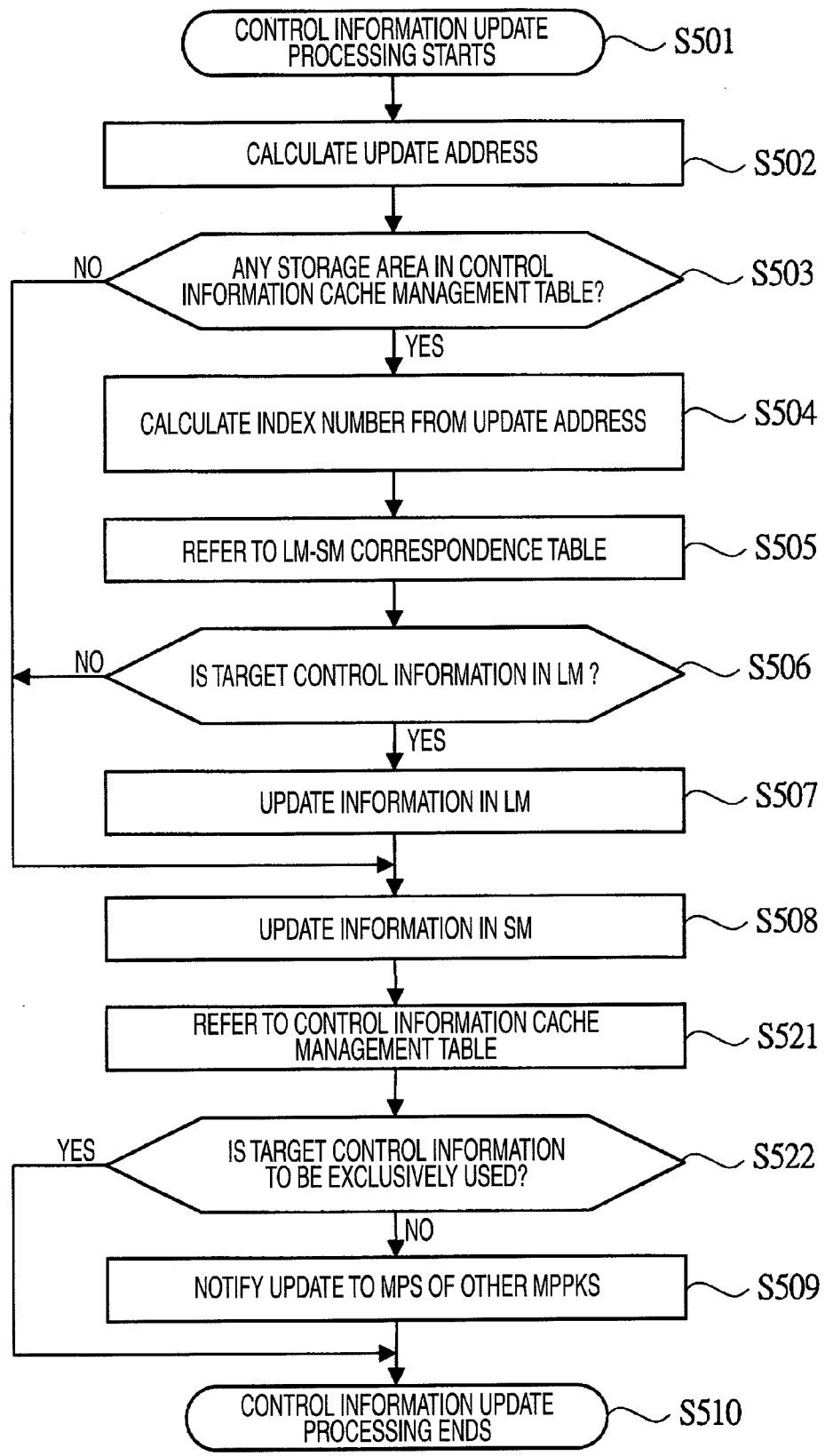
FIG. 33 is a flowchart illustrating an example of the operation of control information update notification receiving processing in the control information access routine according to the fourth embodiment of the invention.

FIG. 33 is a flowchart illustrating an example of the operation of control information update notification receiving processing in a control information access routine 3300. It is different from the one of the first embodiment, which has been described with reference to FIG. 18, in that it further includes steps S521 and S522.

In steps S501 to S508, the MP 1210 calculates the update address in response to a control information update request and updates information in the LM 1220 and SM 1300. After that, with reference to the control information cache management table 5220, the MP 1210 obtains the values stored in the exclusive use flag field 5224 of the entry corresponding to the updated control information piece 4000 (S521). Next, whether the obtained value stored in the exclusive use flag field 5224 is "1" or not, that is, whether the updated control information piece 4000 is a control information piece 4000 to be exclusively used by a specific MPPK 1200 or not is determined (S522).

If so in step S522, the control information update processing ends (S510), without performing the update notification to other MPPKs 1200 in step S509. If the updated control information piece 4000 is a control information piece 4000 to be used by multiple MPPKs 1200, the update notification to other MPPKs 1200 is performed (S509), and the control information update processing ends (S510).

In this way, no control information update notification relating to a control information piece 4000 to be exclusively used by an MPPK 1200 can prevent the occurrence of communication among MPPKs 1200 and processing with the reception of the update notification, which can enhance the performance of the system.

When the responsible MPPK for an LDEV 1500 is changed, old information may remain in the control information cache area 5100 in the responsible MPPK before the change because no update notification is performed for an exclusively used control information piece 4000. In this case, there is a possibility of not being accessible to the right information by the responsible MPPK before the change. In order to prevent this, the MPPK 1200 that is responsible for an increased number of LDEVs 1500 due to the new setting or change of the responsible MPPK in the configuration changing routine 3400 must allow other MPPKs 1200 to access the latest information by invoking a routine after a responsible MPPK is set, which will be described later.

Figure 34:
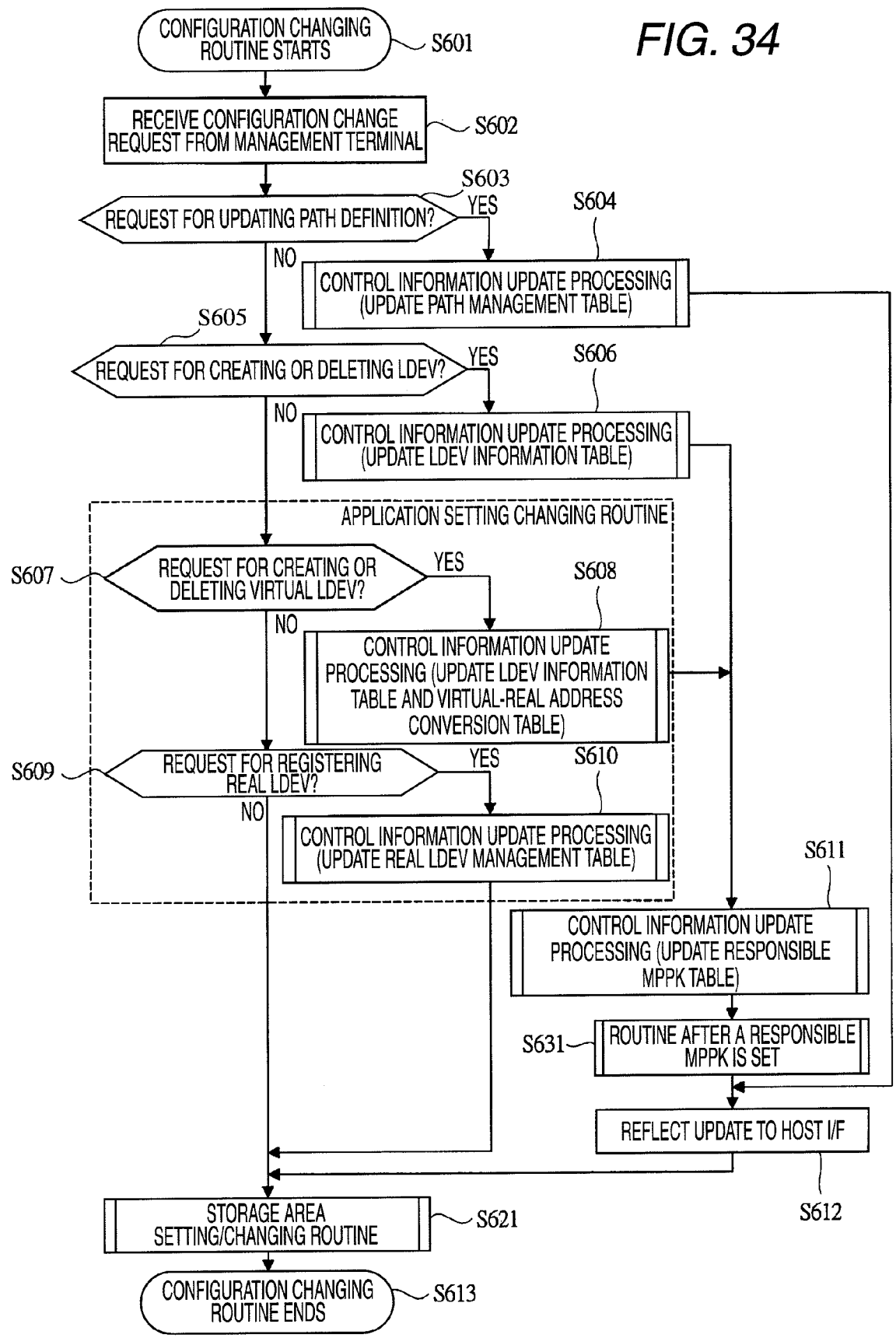
FIG. 34 is a flowchart illustrating an example of the operation in the configuration changing routine according to the fourth embodiment of the invention.

FIG. 34 is a flowchart illustrating an example of the operation in the configuration changing routine 3400. It is different from the one of the second embodiment, which has been described with reference to FIG. 24, in that it further includes step S631.

After updating the responsible MPPK table 4200 in step S611, the MP 1210 causes the MP 1210 of the responsible MPPK for an LDEV 1500, which is created or newly defined, to perform a routine after a responsible MPPK is set, which will be described later (S631). For example, if the own MPPK is the responsible MPPK for a target LDEV 1500, the own MPPK invokes the routine after the responsible MPPK is set. If another MPPK is the responsible MPPK, the responsible MPPK may be caused to invoke the routine after the responsible MPPK is set by writing a processing request into the communication area 5300 in the LM 1220 of the responsible MPPK.

Figure 35:
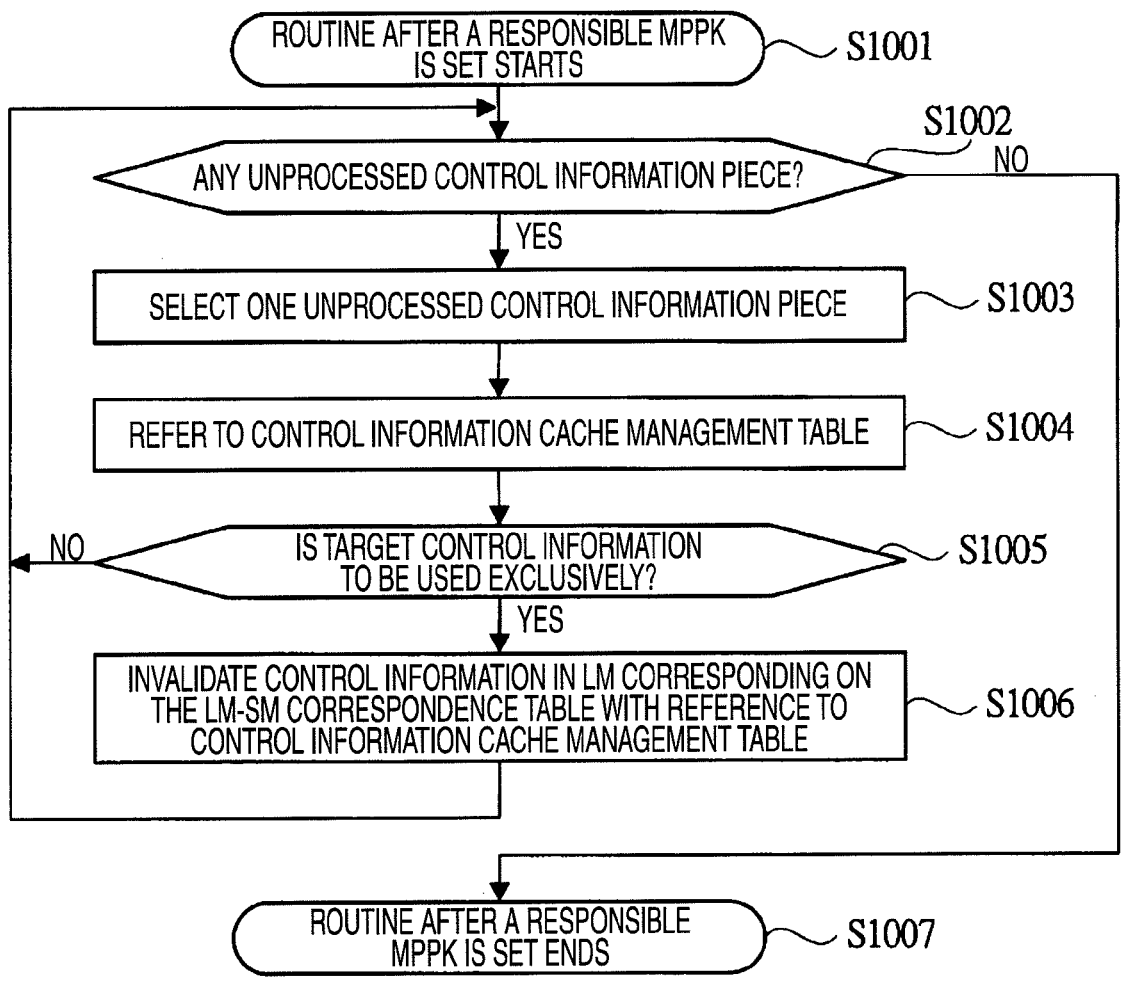
FIG. 35 is a flowchart illustrating an example of the operation of the routine after the responsible MPPK is set in the configuration changing routine according to the fourth embodiment of the invention.

FIG. 35 is a flowchart illustrating an example of the operation of the routine after the responsible MPPK is set in the configuration changing routine 3400.

If the routine after the responsible MPPK is set in the configuration changing routine 3400 starts (S1001), the MP 1210 first determines whether any unprocessed control information piece 4000 exists or not (S1002). In this case, whether any of the control information pieces 4000 identified by the control information name fields 5221 on the control information cache management table 5220 is unprocessed or not is determined.

If not in step S1002, the routine after the responsible MPPK is set ends (S1007). If so, one of the control information pieces 4000 is selected (S1003), and the processing in subsequent steps S1004 to S1006 is performed on the selected control information piece 4000.

More specifically, with reference to the control information cache management table 5220, the value stored in the exclusive use flag field 5224 of the entry corresponding to the target control information piece 4000 is first obtained (S1004). Next, whether the obtained value in the exclusive use flag field 5224 is "1" or not, that is, whether the target control information piece 4000 is to be used exclusively or not is determined (S1005). If the value in the exclusive use flag field 5224 is not "1", that is, if the target control information piece 4000 is used by multiple MPPKs 1200, the routine returns to step S1002 where the processing on the remaining control information pieces 4000 is performed.

If the value in the exclusive use flag field 5224 is "1", that is, if the target control information piece 4000 is to be used exclusively in step S1005, the range of the index number stored in the storage area index number range field 5223 of the entry corresponding to the target control information piece 4000 is obtained with reference to the control information cache management table 5220. By deleting the values in the SM address field 5212 and last access time field 5213 of all entries on the LM-SM correspondence table 5210, which correspond to the index numbers included in the range, the cached control information piece 4000 is invalidated (S1006).

When the responsible MPPK is changed, the processing above invalidates the control information piece 4000 to be used exclusively by the responsible MPPK if it exists in the control information cache area 5100 in the LM 1220 of another MPPK 1200. The control information piece 4000 relating to the LDEV 1500 for which the responsible MPPK is changed may only be invalidated in the exclusively used control information pieces 4000, instead of the invalidation of the control information pieces 4000 relating to all LDEVs 1500.

In this way, the performance of the system can be enhanced by caching the control information piece 4000 which is referred frequently in the LM 1220 and accessing it. A control information piece 4000 which is rarely updated among control information pieces 4000 may be cached in the LMs 1220 of all MPPKs 1200, and an update notification may be transmitted to other MPPKs 1200 when one MPPK 1200 among them is updated.

A control information piece 4000 which is updated frequently but is accessed only by a specific MPPK 1200 may be cached in the MPPK 1200 as described above, which can omit the update notification to other MPPKs 1200. As described above, the update notification can be omitted for a control information piece 4000 not to be cached in all MPPKs 1200, such as statistics information. In other words, the update notification can be omitted for a control information piece 4000, which is not cached in all MPPKs 1200.

As described above, in the storage system 1000 of this embodiment, a control information piece 4000 which is only accessed by a specific MPPK 1200 may be cached in the MPPK 1200 only, which can omit the update notification to the other MPPKs 1200 and thus can reduce the number of control information update notifications. The reduction of the communication among the MPPKs 1200 and processing with the reception of update notifications can enhance the performance of the system.

Having specifically described the invention made by the inventor on the basis of embodiments, the invention is not limited to the embodiments. Various changes can be made thereto without departing from the scope and spirit of the invention.

For example, the numbers of the components in the computer systems of the first to fourth embodiments may be only one for simple description. However, they may be duplexed for higher reliability.

The invention is applicable to a storage system having multiple processors and controlling a disk device by using control information in a shared memory and a control program and storage system control method therefor.

What is claimed is:

1. A storage system, comprising:
   at least a logical volume storing data from a host computer;
   a plurality of processor packages, each of which includes at least one processor and a local memory; and
   a shared memory shared by the processors, which stores control information comprising at least a first type and a second type of control information for processing,
   wherein:
   each of the local memories is divided into a plurality of areas, one of the areas being dedicated for the first type of control information; and
   each of the processors is configured to put a part of the first type of control information in the one of the areas of the local memory in the processor package where the processor is included.

2. The storage system according to claim 1, wherein:
   the first of control information is read independently of the area in the logical volume which is accessed by the host computer, and
   the second of control information is read dependently of the area in the logical volume which is accessed by the host computer.

3. The storage system according to claim 1, wherein:
   another one of the areas is dedicated for the second type of control information;
   each of the processors is configured to put a part of the second type of control information in the another one of the areas of the local memory in the processor package where the processor is included.

4. The storage system according to claim 3, wherein:
   the first type of control information is read independently of the area in the logical volume which is accessed by the host computer, and
   the second type of control information is read dependently of the area in the logical volume which is accessed by the host computer.

5. The storage system according to claim 1, wherein the processor determines whether the control information is to be put in the local memory or not by referring to control information stored in the shared memory.

6. The storage system according to claim 5, wherein, if the configuration of the storage system is changed, the processors change the settings of the storage areas in accordance with the changed configuration.

7. The storage system according to claim 6, wherein the processors allocate the storage areas in accordance with the number of volumes on which I/O processing or processing relating to a storage application is performed with reference to the corresponding control information in changing the settings of the storage areas.

8. The storage system according to claim 6, wherein the processors allocate the storage areas for the number of all volumes if one or more volumes exist on which I/O processing or processing relating to a storage application is performed with reference to the corresponding first type of control information in changing the settings of the storage areas.

9. The storage system according to claim 1, further comprising:
   a management terminal, wherein the status of the storage area for each of the processors is displayed on the management terminal, and the setting of the storage area or each of the storage areas is changed on the basis of the data input from the management terminal.

10. The storage system according to claim 9, wherein the status of the storage area for each of the processors displayed in the management terminal includes a cache hit probability in the local memory.

11. The storage system according to claim 1, wherein the processors updating the control information stored in the shared memory notify the update of the control information to the other processors.

12. The storage system according to claim 11, wherein each of the processors having received the notification of the update of the control information from the other processors invalidates the update if the control information to be updated is cached in the corresponding local memory.

13. The storage system according to claim 11, wherein the processors updating the control information stored in the shared memory do not notify the update of the control information to the other processors if the control information to be updated is the control information which has not been cached by any of the other processors in the corresponding local memories.

14. The storage system according to claim 13, wherein the control information which has not been cached by any of the other processors in the corresponding local memories includes the control information accessible only by the processor which is responsible for the volume on which I/O processing or processing relating to a storage application is performed with reference to the corresponding control information.

15. A method for controlling a storage system including at least a logical volume storing data from a host computer, a plurality of processor packages, each of which includes at least one processor and a local memory; and a shared memory shared by the processors, which stores control information comprising at least a first type and a second type of control information for processing, said method comprising:

dividing each of the local memories into a plurality of areas, one of the areas being dedicated for the first type of control information; and putting, for each of the processors, a part of the first type of control information in the one of the areas of the local memory in the processor package where the processor is included.

16. The method according to claim 15, wherein:

the first of control information is read independently of the area in the logical volume which is accessed by the host computer, and the second of control information is read dependently of the area in the logical volume which is accessed by the host computer.

17. The method according to claim 15, wherein:

another one of the areas is dedicated for the second type of control information; and said method further comprising, putting, for each of the processors, a part of the second type of control information in the another one of the local memory in the processor package where the processor is included.

18. The method according to claim 17, wherein:

the first of control information is read independently of the area in the logical volume which is accessed by the host computer, and the second of control information is read dependently of the area in the logical volume which is accessed by the host computer.

* * * * *